(12) United States Patent  
Li et al.

(10) Patent No.: US 11,775,111 B2  
(45) Date of Patent: Oct. 3, 2023

(54) METHOD FOR CONTROLLING TOUCHSCREEN AND ELECTRONIC DEVICE

(71) Applicant: Huawei Technologies Co., Ltd., Shenzhen (CN)

(72) Inventors: Hang Li, Shenzhen (CN); Weigang Cai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 17/641,333

(22) PCT Filed: Jul. 28, 2020

(86) PCT No.: PCT/CN2020/105283  
§ 371 (c)(1),  
(2) Date: Mar. 8, 2022

(87) PCT Pub. No.: WO2021/052015  
PCT Pub. Date: Mar. 25, 2021

(65) Prior Publication Data  
US 2022/0334668 A1    Oct. 20, 2022

(30) Foreign Application Priority Data

Sep. 19, 2019 (CN) .......................... 201910889275.8

(51) Int. Cl.
| | | |
|---|---|---|
| *G06F 3/041* | (2006.01) | |
| *G06F 3/044* | (2006.01) | |
| *G06F 1/16* | (2006.01) | |
| *G06F 1/3234* | (2019.01) | |
| *G06F 1/3231* | (2019.01) | |
| *G06F 3/04886* | (2022.01) | |
| *H04M 1/02* | (2006.01) | |

(52) U.S. Cl.  
CPC ........ *G06F 3/04166* (2019.05); *G06F 1/1616* (2013.01); *G06F 1/1641* (2013.01); (Continued)

(58) Field of Classification Search  
CPC .. G06F 3/0416; G06F 3/0446; G06F 3/04166; G06F 3/04883; G06F 3/04886; (Continued)

(56) References Cited

U.S. PATENT DOCUMENTS

2009/0228807 A1    9/2009    Lemay  
2011/0241907 A1    10/2011   Cordeiro  
(Continued)

FOREIGN PATENT DOCUMENTS

CN    102855032 A    1/2013  
CN    102866817 A    1/2013  
(Continued)

*Primary Examiner* — Darlene M Ritchie  
(74) *Attorney, Agent, or Firm* — Conley Rose, P.C.

(57) ABSTRACT

A touchscreen of an electronic device includes a first region and a second region, which each correspond to a baseline, and the baseline corresponds to a capacitance value when a region corresponding to the baseline is not touched. A method for controlling the touchscreen includes that the electronic device receives a first touch signal in a first region on the touchscreen, and the electronic device maintains a baseline corresponding to the first region unchanged in response to the first touch signal in the first region.

20 Claims, 19 Drawing Sheets

(52) U.S. Cl.
CPC .......... *G06F 1/3231* (2013.01); *G06F 1/3262* (2013.01); *G06F 3/0416* (2013.01); *G06F 3/0446* (2019.05); *G06F 3/04886* (2013.01); *G06F 2203/04102* (2013.01); *H04M 1/0214* (2013.01); *H04M 1/0245* (2013.01); *H04M 2250/16* (2013.01); *H04M 2250/22* (2013.01)

(58) Field of Classification Search
CPC .......... G06F 3/044; G06F 2203/04102; G06F 1/1641; G06F 1/1652; G06F 1/3231; G06F 1/3262; G06F 1/1616; G06F 1/3265; G06F 3/0418; H04M 1/0245; H04M 1/0214; H04M 1/0268; H04M 2250/22; H04M 2250/16
See application file for complete search history.

(56) References Cited

U.S. PATENT DOCUMENTS

| | | | |
|---|---|---|---|
| 2012/0242617 A1* | 9/2012 | Lee | G06F 3/0418 345/173 |
| 2013/0106735 A1 | 5/2013 | Lee et al. | |
| 2014/0071085 A1* | 3/2014 | Kasamatsu | G06F 3/041 345/174 |
| 2014/0306553 A1 | 10/2014 | Lee | |
| 2014/0313146 A1 | 10/2014 | Munechika | |
| 2016/0110017 A1* | 4/2016 | Tsai | G06F 3/04186 345/174 |
| 2016/0195986 A1 | 7/2016 | Kwon et al. | |
| 2018/0095521 A1* | 4/2018 | Tadinada | G06F 3/04166 |
| 2019/0079576 A1* | 3/2019 | Liu | G06F 3/04166 |

FOREIGN PATENT DOCUMENTS

| | | |
|---|---|---|
| CN | 103488364 A | 1/2014 |
| CN | 105122174 A | 12/2015 |
| CN | 106293213 A | 1/2017 |
| CN | 107390907 A | 11/2017 |
| CN | 107817925 A | 3/2018 |
| CN | 107908314 A | 4/2018 |
| CN | 109918008 A | 6/2019 |
| EP | 2977850 A1 | 1/2016 |

* cited by examiner

METHOD FOR CONTROLLING TOUCHSCREEN AND ELECTRONIC DEVICE

CROSS-REFERENCE TO RELATED APPLICATIONS

This is a U.S. National Stage of International Patent Application No. PCT/CN2020/105283 filed on Jul. 28, 2020, which claims priority to Chinese Patent Application No. 201910889275.8 filed on Sep. 19, 2019. Both of the aforementioned applications are hereby incorporated by reference in their entireties.

TECHNICAL FIELD

Embodiments of this application relate to the field of communications technologies, and in particular, to a method for controlling a touchscreen and an electronic device.

BACKGROUND

Screen forms of a conventional terminal device include a bezel-less screen, a side curved screen, a foldable screen, and the like with development of screen forms of a terminal device. In a conventional screen touch method, a touch algorithm for an entire screen is maintained by using a baseline (baseline), and a change of the baseline is detected to identify a touch operation such as a tap operation or a slide operation performed by a user. Once the user touches the screen, the baseline is not updated until a finger of the user leaves the screen.

However, in the conventional screen touch method, when a terminal device is held by the user and a region touched by the finger of the user is a touch region, the baseline is stopped updating. However, in a process in which the user holds the terminal device, a capacitance value of a capacitor may change greatly due to factors such as an ambient temperature, humidity, and noise. If the baseline is not updated in time, a user touch exception occurs, and user experience is poor.

SUMMARY

Embodiments of this application provide a method for controlling a touchscreen and an electronic device, to avoid a user touch exception, and improve user experience.

To achieve the foregoing objectives, the following technical solutions are used in the embodiments of this application.

According to a first aspect of the embodiments of this application, a method for controlling a touchscreen is provided. The touchscreen includes a first region and a second region, the first region and the second region each correspond to a baseline, the baseline corresponds to a capacitance value when a region corresponding to the baseline is not touched, and the method includes: An electronic device receives a first touch signal in the first region. The electronic device maintains a baseline corresponding to the first region unchanged in response to the first touch signal. In this solution, a plurality of baselines are maintained, so that the baseline corresponding to the first region can be stopped updating when a user holds the first region. Because the second region corresponds to another baseline, when stopping updating the baseline corresponding to the first region touched by the user, the electronic device may continue updating the baseline corresponding to the second region. In this way, the electronic device can quickly and accurately identify a touch operation performed by the user in the second region, thereby improving user experience.

With reference to the first aspect, in a first possible implementation, the method further includes: When the electronic device does not detect a second touch signal in the second region, the electronic device updates a baseline corresponding to the second region. In this solution, the plurality of baselines are maintained, so that the baseline corresponding to the first region can be stopped updating when the user touches the first region, and when the user does not touch the second region, the baseline corresponding to the second region is updated. In this way, the electronic device can quickly and accurately identify a touch operation performed by the user in the second region, thereby improving user experience.

With reference to the first aspect and the foregoing possible implementation, in another possible implementation, the first region and the second region do not overlap each other. In this solution, the screen of the electronic device may include a plurality of regions that do not overlap each other.

With reference to the first aspect and the foregoing possible implementations, in another possible implementation, the first region is a region touched by a hand of a user when the electronic device is held by the user. In this solution, when being held the first region, the electronic device can stop updating the baseline corresponding to the first region, but update a baseline corresponding to another region (for example, the second region) other than the first region. Therefore, it is ensured that the electronic device can quickly and accurately identify a touch operation in the second region.

With reference to the first aspect and the foregoing possible implementations, in another possible implementation, the touchscreen of the electronic device is a curved screen with a radian on a side edge. In this solution, the electronic device may have the curved screen.

With reference to the first aspect and the foregoing possible implementations, in another possible implementation, the touchscreen includes a region of a main control screen and a region of a side curved screen, and the first region is the region of a side curved screen. In this solution, the curved screen can be divided into the region of a main control screen and the region of a side curved screen, so that when the user holds the region of a side curved screen, a baseline corresponding to the region of a side curved screen is stopped updating, and a baseline corresponding to the region of the main control screen is updated. Therefore, it is ensured that the electronic device can quickly and accurately identify a touch operation in the region of the main control screen.

With reference to the first aspect and the foregoing possible implementations, in another possible implementation, the touchscreen includes a region of a main control screen, a region of a first side curved screen, and a region of a second side curved screen; and the first region is at least one of the region of a first side curved screen and the region of a second side curved screen. In this solution, the curved screen can be divided into the region of a main control screen, the region of a first side curved screen, and the region of a second side curved screen, so that when the user holds the region of a first side curved screen and/or the region of a second side curved screen, a baseline corresponding to the region of a first side curved screen and/or a baseline corresponding to the region of a second side curved screen are/is stopped updating, and a baseline corresponding to a region other than the region of a first side curved screen and the region of a second side curved screen is updated. Therefore, it is ensured that the electronic device can quickly and accurately identify a touch operation in the region of a main control screen (and the region of a second side curved screen/the region of a first side curved screen).

With reference to the first aspect and the foregoing possible implementations, in another possible implementation, the electronic device is a foldable electronic device, and the electronic device is in a folded state. In this solution, the electronic device can be the foldable-screen electronic device in the folded state.

With reference to the first aspect and the foregoing possible implementations, in another possible implementation, the touchscreen includes a region of a primary screen, a region of a secondary screen, and a region of a side screen; and the first region is at least one of the region of a primary screen, the region of a secondary screen, and the region of a side screen. In this solution, the foldable screen can be divided into the region of a primary screen, the region of a secondary screen, and the region of a side screen.

With reference to the first aspect and the foregoing possible implementations, in another possible implementation, the folded state is a state in which an included angle between the primary screen and the secondary screen is less than a first preset angle threshold. In this solution, when the included angle between the primary screen and the secondary screen of the electronic device is less than the first preset angle threshold, the screen of the electronic device can be divided into at least two regions.

With reference to the first aspect and the foregoing possible implementations, in another possible implementation, the method further includes: The electronic device reduces an emission frequency of a drive electrode in the first region in response to the first touch signal. In this solution, the emission frequency of the drive electrode in the first region is reduced, so that power consumption of the screen of the electronic device can be reduced.

With reference to the first aspect and the foregoing possible implementations, in another possible implementation, the method further includes: When the electronic device does not detect the first touch signal in the first region, the electronic device restores the emission frequency of the drive electrode in the first region. In this solution, when the user no longer touches the first region, the emission frequency of the drive electrode in the first region is restored. Therefore, it can be ensured that when the user touches the first region again, the electronic device can quickly identify the touch operation performed by the user in the first region.

With reference to the first aspect and the foregoing possible implementations, in another possible implementation, the drive electrode is a longitudinal electrode. In this solution, the emission frequency of the longitudinal drive electrode in the first region is reduced, so that power consumption of the screen of the electronic device can be reduced.

According to a second aspect of the embodiments of this application, an electronic device is provided. The electronic device includes: a touchscreen, including a first region and a second region, the first region and the second region each correspond to a baseline, the baseline corresponds to a capacitance value when a region corresponding to the baseline is not touched; and a processing unit, configured to receive a first touch signal in the first region, where the processing unit maintains a baseline corresponding to the first region unchanged in response to the first touch signal.

With reference to the second aspect, in a possible implementation, the processing unit is further configured to: when the processing unit does not detect a second touch signal in the second region, the processing unit updates a baseline corresponding to the second region.

With reference to the second aspect and the foregoing possible implementation, in another possible implementation, the first region and the second region do not overlap each other.

With reference to the second aspect and the foregoing possible implementations, in another possible implementation, the first region is a region touched by a hand of a user when the electronic device is held by the user.

With reference to the second aspect and the foregoing possible implementations, in another possible implementation, the touchscreen of the electronic device is a curved screen with a radian on a side edge.

With reference to the second aspect and the foregoing possible implementations, in another possible implementation, the touchscreen includes a region of a main control screen and a region of a side curved screen, and the first region is the region of a side curved screen.

With reference to the second aspect and the foregoing possible implementations, in another possible implementation, the touchscreen includes a region of a main control screen, a region of a first side curved screen, and a region of a second side curved screen; and the first region is at least one of the region of a first side curved screen and the region of a second side curved screen.

With reference to the second aspect and the foregoing possible implementations, in another possible implementation, the electronic device is a foldable electronic device, and the electronic device is in a folded state.

With reference to the second aspect and the foregoing possible implementations, in another possible implementation, the touchscreen includes a region of a primary screen, a region of a secondary screen, and a region of a side screen; and the first region is at least one of the region of a primary screen, the region of a secondary screen, and the region of a side screen.

With reference to the second aspect and the foregoing possible implementations, in another possible implementation, the folded state is a state in which an included angle between the primary screen and the secondary screen is less than a first preset angle threshold.

With reference to the second aspect and the foregoing possible implementations, in another possible implementation, the processing unit is further configured to: the processing unit reduces an emission frequency of a drive electrode in the first region in response to the first touch signal.

With reference to the second aspect and the foregoing possible implementations, in another possible implementation, the processing unit is further configured to: when the processing unit does not detect the first touch signal in the first region, the processing unit restores the emission frequency of the drive electrode in the first region.

With reference to the second aspect and the foregoing possible implementations, in another possible implementation, the drive electrode is a longitudinal electrode.

According to a third aspect of the embodiments of this application, a circuit system for controlling a touchscreen is provided. The circuit system includes a processing unit, the touchscreen includes a first region and a second region, the first region and the second region each correspond to a baseline, the baseline corresponds to a capacitance value when a region corresponding to the baseline is not touched, and the processing unit is configured to: receive a first touch signal in the first region; and maintain a baseline corresponding to the first region unchanged in response to the first touch signal.

With reference to the third aspect, in a possible implementation, the processing unit is further configured to: when the processing unit does not detect a second touch signal in the second region, the processing unit updates a baseline corresponding to the second region.

With reference to the third aspect and the foregoing possible implementation, in another possible implementation, the first region and the second region do not overlap each other.

With reference to the third aspect and the foregoing possible implementations, in another possible implementation, the first region is a region touched by a hand of a user when the electronic device is held by the user.

With reference to the third aspect and the foregoing possible implementations, in another possible implementation, the touchscreen of the electronic device is a curved screen with a radian on a side edge.

With reference to the third aspect and the foregoing possible implementations, in another possible implementation, the touchscreen includes a region of a main control screen and a region of a side curved screen, and the first region is the region of a side curved screen.

With reference to the third aspect and the foregoing possible implementations, in another possible implementation, the touchscreen includes a region of a main control screen, a region of a first side curved screen, and a region of a second side curved screen; and the first region is at least one of the region of a first side curved screen and the region of a second side curved screen.

With reference to the third aspect and the foregoing possible implementations, in another possible implementation, the electronic device is a foldable electronic device, and the electronic device is in a folded state.

With reference to the third aspect and the foregoing possible implementations, in another possible implementation, the touchscreen includes a region of a primary screen, a region of a secondary screen, and a region of a side screen; and the first region is at least one of the region of a primary screen, the region of a secondary screen, and the region of a side screen.

With reference to the third aspect and the foregoing possible implementations, in another possible implementation, the folded state is a state in which an included angle between the primary screen and the secondary screen is less than a first preset angle threshold.

With reference to the third aspect and the foregoing possible implementations, in another possible implementation, the processing unit is further configured to: the processing unit reduces an emission frequency of a drive electrode in the first region in response to the first touch signal.

With reference to the third aspect and the foregoing possible implementations, in another possible implementation, the processing unit is further configured to: when the processing unit does not detect the first touch signal in the first region, the processing unit restores the emission frequency of the drive electrode in the first region.

With reference to the third aspect and the foregoing possible implementations, in another possible implementation, the drive electrode is a longitudinal electrode.

According to a fourth aspect of the embodiments of this application, an embodiment of this application provides a computer storage medium. The computer storage medium includes computer instructions. When the computer instructions are run on an electronic device, the electronic device is enabled to perform the method for controlling a touchscreen in any one of the foregoing aspects and the possible design manners of the foregoing aspects.

According to a fifth aspect of the embodiments of this application, an embodiment of this application provides a computer program product. When the computer program product runs on a computer, the computer is enabled to perform the method for controlling a touchscreen in any one of the foregoing aspects and the possible design manners of the foregoing aspects.

For descriptions of effects of the second aspect, the third aspect, the fourth aspect, and the fifth aspect, refer to descriptions of corresponding effects of the first aspect. Details are not described herein again.

DESCRIPTION OF EMBODIMENTS

Figure 1A:
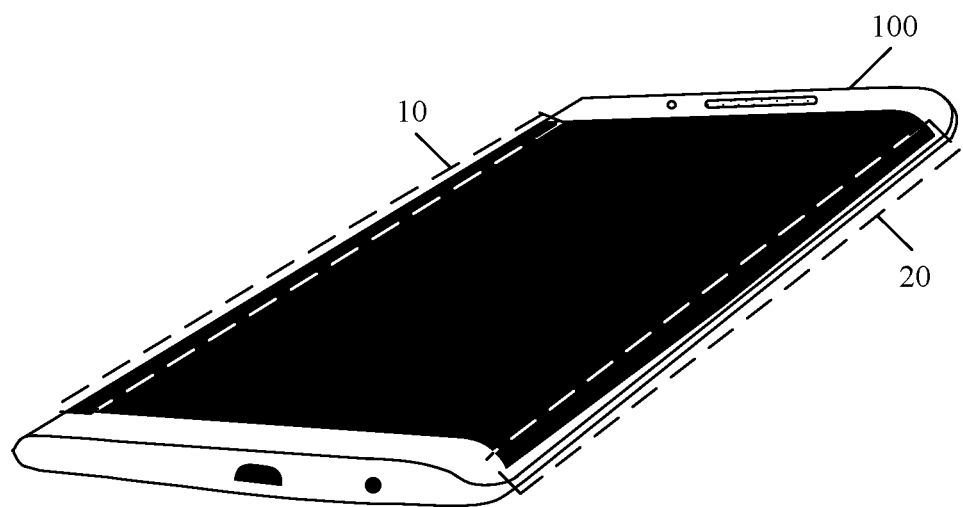
FIG. 1(a) to FIG. 1(c) are schematic diagrams of product forms of a curved phone according to an embodiment of this application.

The following describes the technical solutions in embodiments of this application with reference to accompanying drawings in the embodiments of this application. In this application, "at least one" means one or more, and "a plurality of" means two or more. The term "and/or" describes an association relationship for describing associated objects and represents that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence. For example, "first" in a first application and "second" in a second application in the embodiments of this application are only used to distinguish between different applications. Descriptions such as "first", "second" in the embodiments of this application are merely used for indicating and distinguishing between described objects, do not show a sequence, do not indicate a specific limitation on a quantity of devices in the embodiments of this application, and do not constitute any limitation on the embodiments of this application.

It should be noted that, in this application, a term such as "example" or "for example" is used to represent giving an example, an illustration, or descriptions. Any embodiment or design solution described as an "example" or "for example" in this application should not be explained as being more preferable or having more advantages than another embodiment or design solution. Exactly, use of the word such as "example" or "for example" is intended to present a related concept in a specific manner.

The embodiments of this application provide a method for controlling a touchscreen. The method for controlling a touchscreen is applied to an electronic device. When the electronic device is held by a user, a region touched by a finger of the user is a touch region. For example, the screen of the electronic device may be a curved screen with a radian on a side edge, or may be a foldable screen. A specific form of the screen of the electronic device is not limited in the embodiments of this application. Descriptions are provided by using an example in which the screen of the electronic device is a curved screen and a foldable screen herein. The screen of the electronic device may also be in another form in actual application.

Figure 1B:
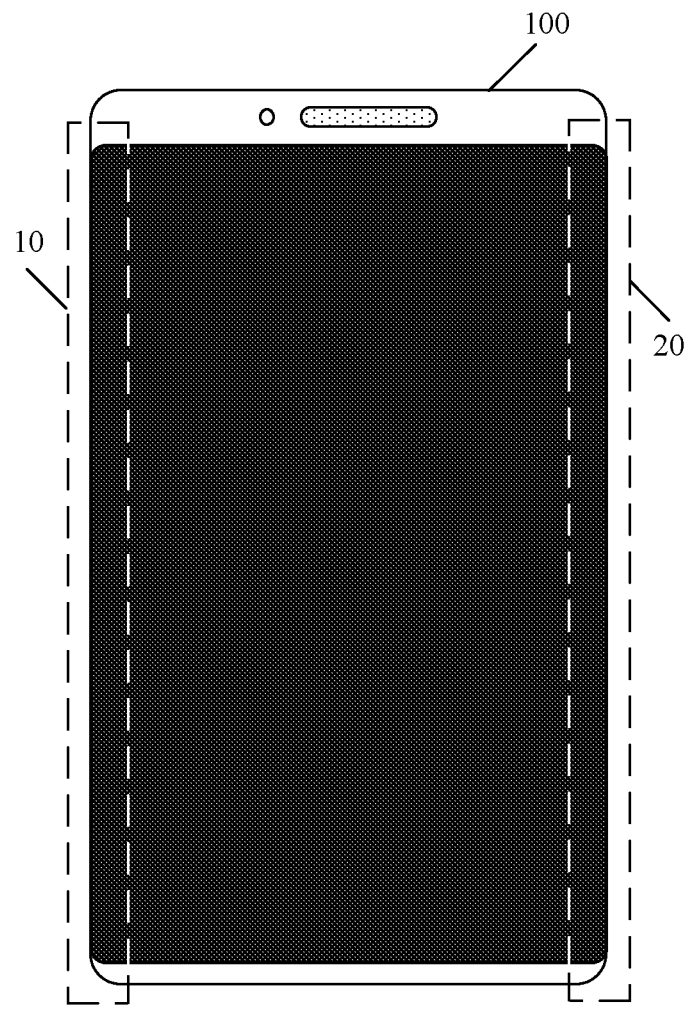

For example, the screen of the electronic device is a curved screen with a radian on a side edge. For example, the electronic device is a curved-screen phone as shown FIG. 1(a) to FIG. 1(c). FIG. 1(a) is a solid figure of the curved-screen phone 100. FIG. 1(b) is a main view of the curved-screen phone 100. As shown in FIG. 1(a) and FIG. 1(b), a screen of the mobile phone 100 is a curved screen with a radian on each of a left side edge 10 and a right side edge 20.

Figure 1C:
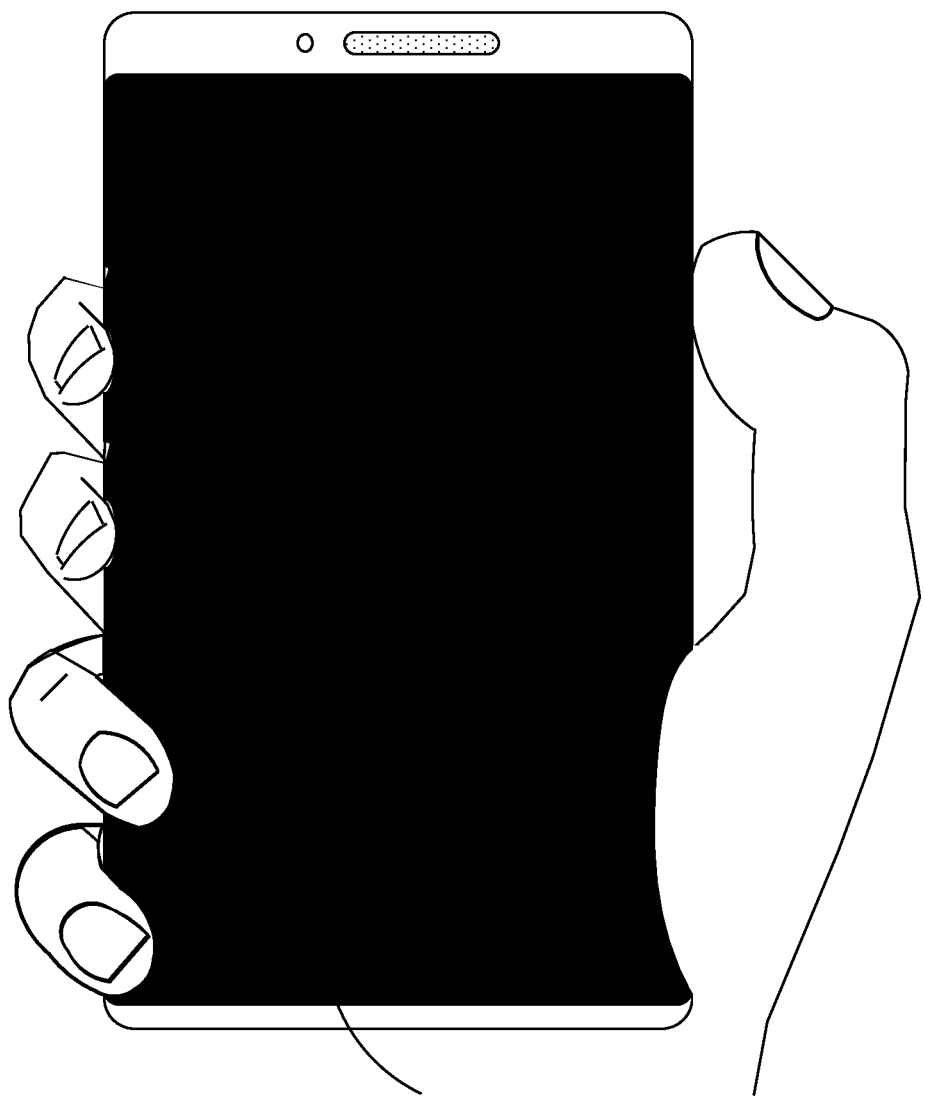

The screen of the curved-screen phone is the curved screen with a radian on a side edge. Therefore, when a user holds the curved-screen phone, a finger of the user comes into large-area contact with a radian region on the side edge of the screen. For example, as shown in FIG. 1(c), the user holds the curved-screen phone with a right hand. A tiger-mouth and a thumb of the right hand of the user are in contact with a radian region on the right side edge of the curved screen, and other fingers of the right hand of the user are in contact with a radian region on the left side edge of the curved screen.

For example, the radian region on the side edge of the curved-screen phone may implement side edge interaction by using a special function and a special gesture. For example, functions such as volume adjustment and quick photographing may be implemented in the radian region on the side edge by using a gesture operation. For another example, a left hand or a right hand of the user may be detected in the radian region on the side edge. A specific function of the radian region on the side edge is not limited in this embodiment of this application, and the description herein is merely an example.

For example, the screen of the electronic device is a foldable screen. For example, the electronic device is a foldable-screen phone. The foldable-screen phone may be classified into two types. One type is a foldable screen that is folded outwards (outward foldable screen for short), and the other type is a foldable screen that is folded inwards (inward foldable screen for short). For example, the foldable screen can be folded as a primary screen and a secondary screen. After the inward foldable screen is folded, the primary screen and the secondary screen are opposite to each other, and are invisible to a user. After the outward foldable screen is folded, the primary screen and the secondary screen are back to back, and are visible to the user. It may be understood that the foldable screen may be folded up and down, or may be folded left and right. This is not limited in this embodiment of this application. Descriptions are provided herein by using an example in which the outward foldable screen is folded left and right.

Figure 2A:
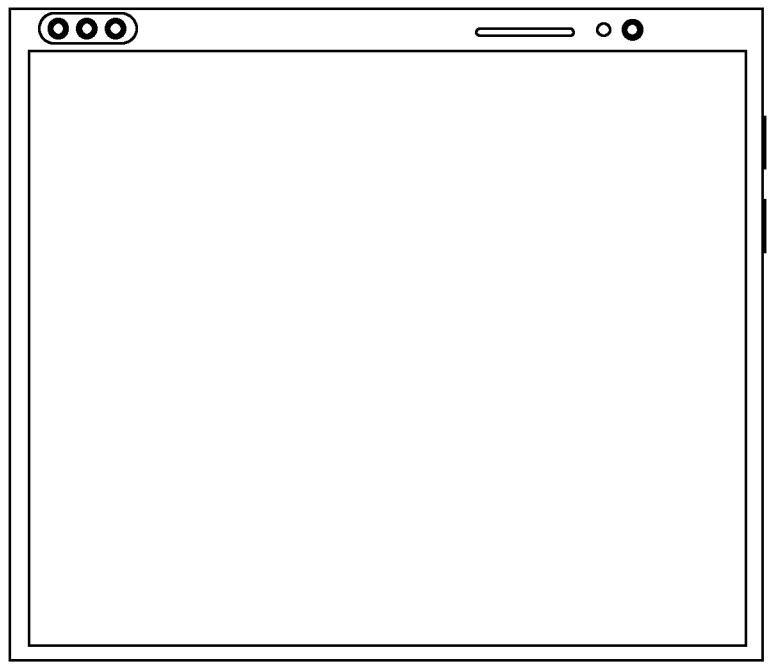
FIG. 2(a) to FIG. 2(d) are schematic diagrams of product forms of a foldable phone according to an embodiment of this application.
Figure 2B:
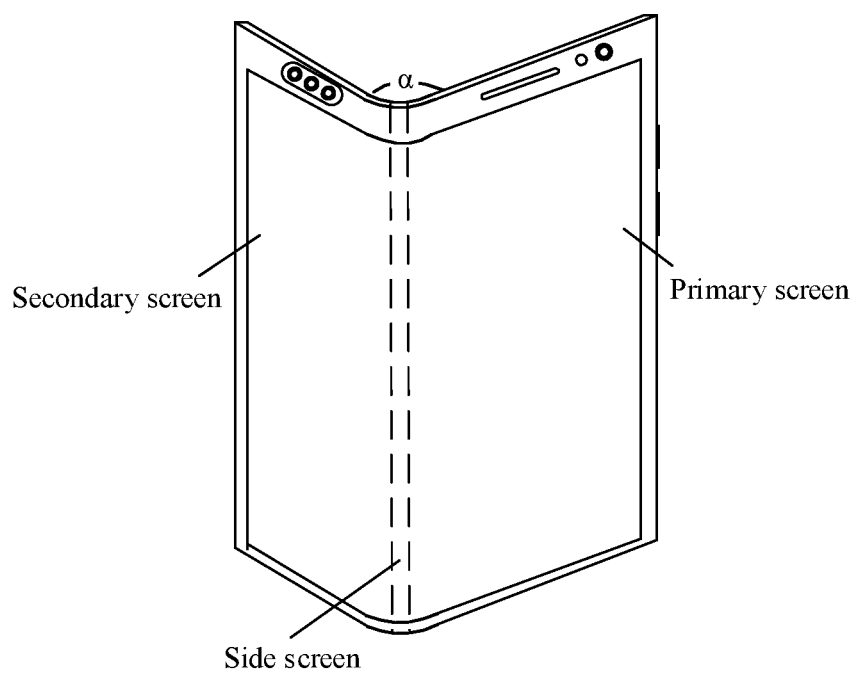
Figure 2C:
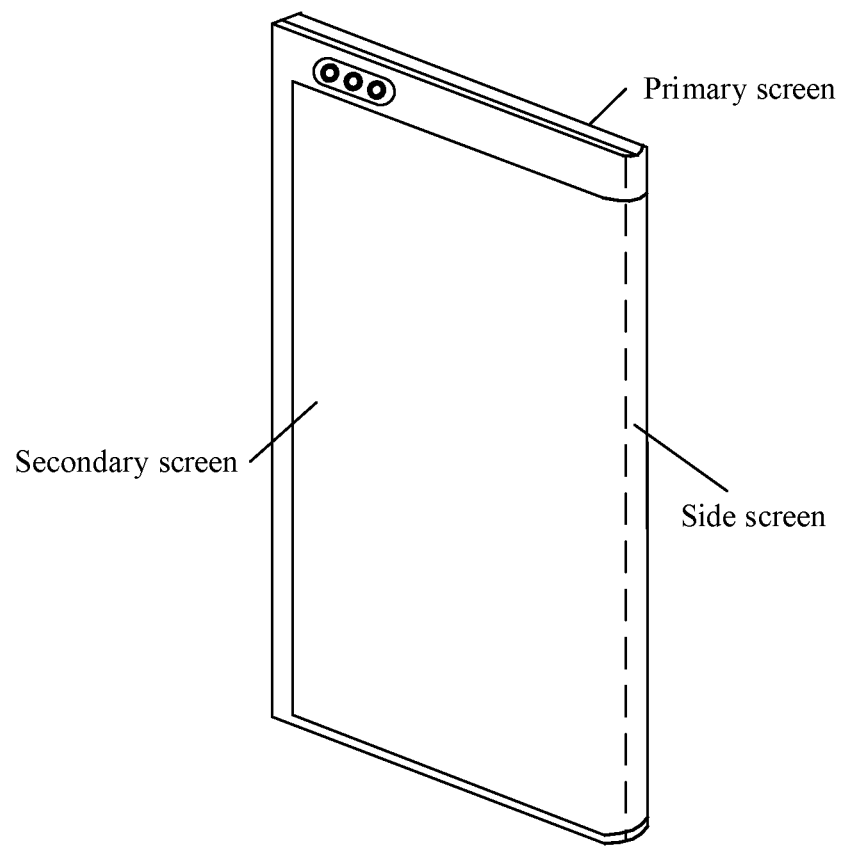

For example, FIG. 2(a) to FIG. 2(d) are schematic diagrams of product forms of a mobile phone with an outward foldable screen according to an embodiment of this application. FIG. 2(a) is a schematic diagram of a form when the outward foldable screen is in a fully unfolded state. As the electronic device is folded, the outward foldable screen may be folded into a form in a semi-folded state shown in FIG. 2(b), and includes a primary screen, a secondary screen, and a side screen. The outward foldable screen may continue to be folded into the foldable screen in a folded state shown in FIG. 2(c). After the foldable-screen phone is totally folded, the primary screen and the secondary screen are back to back, and are visible to the user, as shown in FIG. 2(c).

Figure 2D:
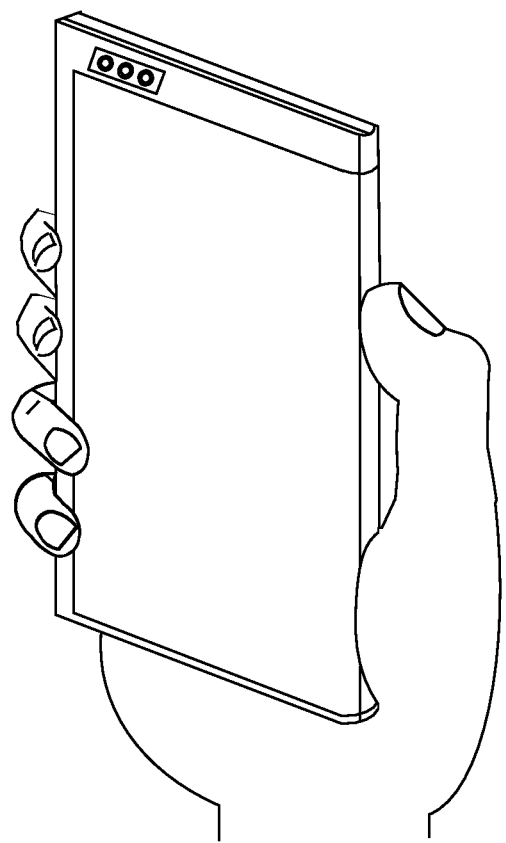

Because the side screen is touchable when the touchscreen of the foldable-screen phone is in the folded state, when a user holds the foldable-screen phone, a finger of the user comes into large-area contact with a region of a side edge of the touchscreen, and a palm of the user may be in contact with the primary screen or the secondary screen. For example, as shown in FIG. 2(d), the user holds the foldable-screen phone with a right hand, a tiger mouth and a thumb of the right hand of the user are in contact with a region on the side screen of the foldable-screen phone, so that a palm of the hand is in contact with a region on the primary screen of the foldable-screen phone, and the secondary screen of the foldable-screen phone faces the user.

For example, the screen of the electronic device shown in FIG. 1(a) to FIG. 2(d) may be a capacitive touchscreen. The capacitive touchscreen can work with any object holding charges, including human skin. The capacitive touchscreen may be a self-capacitive screen, may be a mutual-capacitive screen, or may be a touchscreen in which a self capacitor and a mutual capacitor are combined. This is not limited in this embodiment of this application. Descriptions are provided in the following embodiments only by using an example in which the capacitive touchscreen is a mutual-capacitive screen.

For example, for the mutual-capacitive screen, a transverse electrode and a longitudinal electrode are made on a glass surface by using nano indium tin oxides (Indium Tin Oxides, ITO). A capacitor is formed at an intersection of the two electrodes, that is, the two electrodes separately form two electrodes of the capacitor. When a finger touches the capacitive touchscreen, coupling between the two electrodes near a touch point is affected, and therefore, a capacitance between the two electrodes changes. During detection of mutual capacitance values, excitation signals are sequentially sent by using longitudinal electrodes, and all transverse electrodes simultaneously receive the signals, so that capacitance values at intersections of all the transverse and longitudinal electrodes, namely, capacitance values on a two-dimensional plane of the entire touchscreen, can be obtained. Coordinates of each touch point can be calculated according to two-dimensional capacitance variation data of the touchscreen. It may be understood that the electronic device may sequentially send excitation signals by using the transverse electrodes, and all the longitudinal electrodes simultaneously receive the signals. This is not limited in this embodiment of this application. An electrode used to send an excitation signal may be referred to as a drive electrode, and an electrode used to receive a signal may be referred to as a receive electrode.

For example, a touch principle of the capacitive screen is as follows: When a finger of a user touches the screen, a capacitance value of the mutual capacitor is detected, and a baseline (baseline) is subtracted from the capacitance value to obtain rawdiff (rawdiff). When rawdiff exceeds a finger threshold (finger threshold), it may be determined that the finger touches the screen, and a quantity of fingers that touch the screen, information about a touch location of the user, and the like are determined. Herein, the baseline is a value set based on a capacitance value (which may be referred to as a background capacitance) when the touchscreen is not touched. Because background capacitances corresponding to different regions on the touchscreen are often inconsistent, the baseline may be usually set to an average value of background capacitances corresponding to a plurality of regions on the touchscreen, set to a largest value of the background capacitances of the plurality of regions, set to a value obtained by adding a constant to the average value or the largest value, or set to a value greater than the average value or the largest value. This is not limited in this application.

Conventionally, only one baseline is set on a screen of an electronic device. When a touchscreen of the electronic device is not touched by a user, because a capacitance value of a capacitor dynamically changes with a plurality of factors such as a temperature, humidity, noise, and interference of a charger, the baseline is also dynamically updated with a change of the capacitance value of the capacitor. In this way, the electronic device can sensitively identify a touch operation of the user. However, when the user touches the screen of the electronic device, the baseline is stopped updating. Otherwise, a touch signal of the user is lost through updating, and touch detection cannot be continued. Therefore, when the electronic device is held by the user and a region touched by a finger of the user is a touch region, the baseline is stopped updating. However, in a process in which the user holds the electronic device, a capacitance value of a capacitor changes due to interference factors such as an ambient temperature, humidity, and noise. If the baseline is not updated in time, a user touch screen exception occurs, and user experience is poor.

For example, in a case in which the touchscreen of the electronic device is a curved screen whose side edge has a radian, or a foldable screen, and the electronic device maintains only one baseline, when the user holds the electronic device, a finger of the user is in contact with the touchscreen, and the baseline is stopped updating. However, if the electronic device is affected by charging to have a relatively high temperature, the capacitance value of the capacitor changes greatly. If the baseline is not updated accordingly, inflexible user touch, an unidentified touch, and poor user experience are caused.

For example, when the electronic device in this embodiment of this application is held by the user, the region touched by the finger of the user is the touch region. The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device/a virtual reality (virtual reality, VR) device, or the like. A specific form of the electronic device is not specifically limited in this embodiment of this application.

The following describes implementations of the embodiments of this application in detail with reference to the accompanying drawings.

Figure 3:
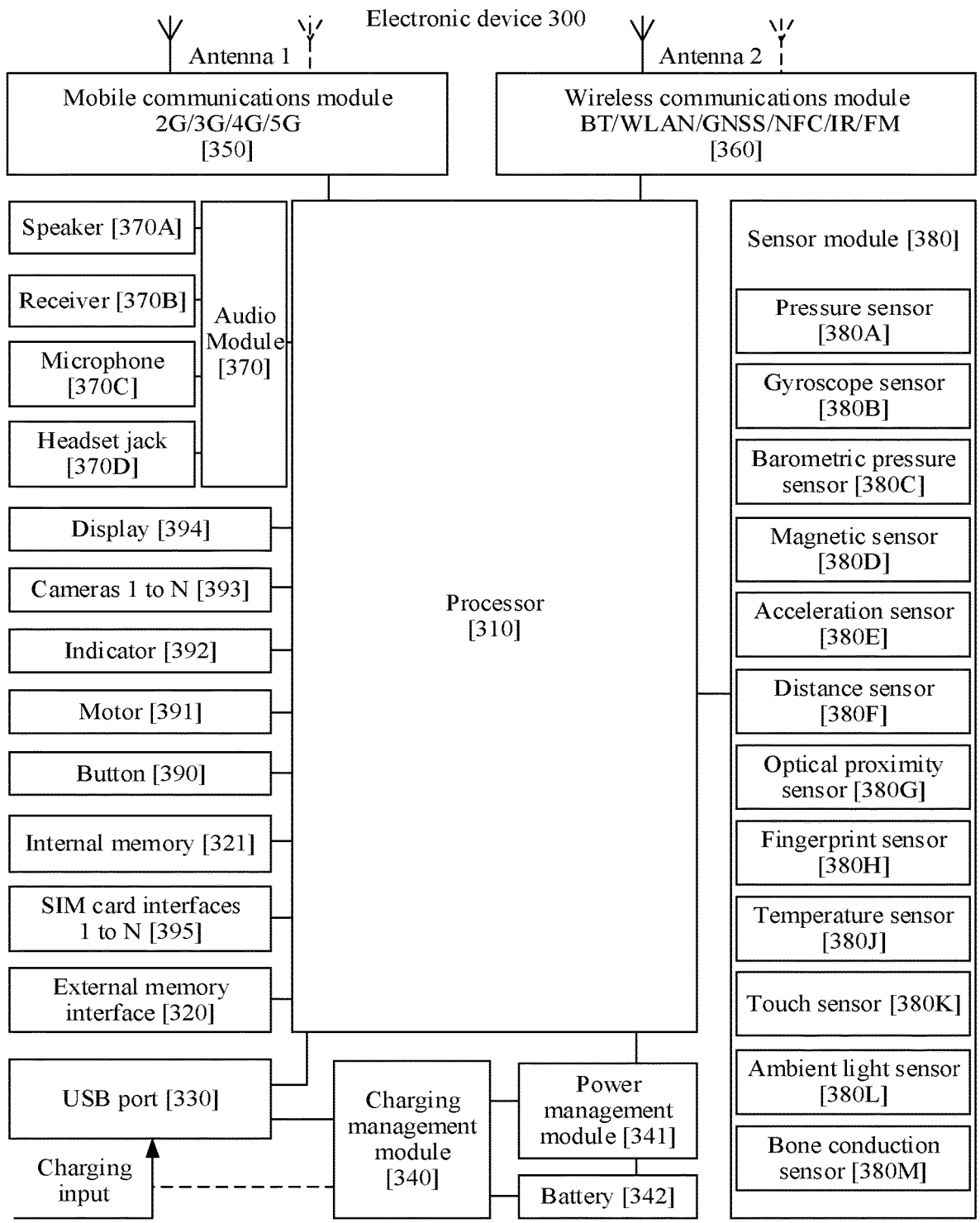
FIG. 3 is a schematic diagram of a hardware structure of an electronic device according to an embodiment of this application.

FIG. 3 is a schematic diagram of a structure of an electronic device 300 according to an embodiment of this application. As shown in FIG. 3, the electronic device 300 may include a processor 310, an external memory interface 320, an internal memory 321, a universal serial bus (universal serial bus, USB) port 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identity module (subscriber identity module, SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It can be understood that, a structure illustrated in this embodiment constitutes no specific limitation on the electronic device 300. In some other embodiments, the electronic device 300 may include more or fewer components than those shown in the figure, or combine some components, or split some components, or have different component arrangements. The components shown in the figure may be implemented by using hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. The AP, the baseband processor, the GPU, and the NPU may be integrated into a system on chip (System on Chip, SOC). In this embodiment of this application, the processor 310 may further include a touch integrated circuit (Integrated Circuit, IC). The touch IC may be configured to perform the method for controlling a touchscreen provided in the embodiments of this application. The touch IC may be an independent chip, or may be integrated into an SOC.

The controller may be a nerve center and a command center of the electronic device 300. The controller may generate an operation control signal based on instruction operation code and a time sequence signal, to complete control of instruction reading and instruction execution.

A memory may be further disposed in the processor 310, and is configured to store an instruction and data. In some embodiments, the memory in the processor 310 is a cache memory. The memory may store an instruction or data that has just been used or has been repeatedly used by the processor 310. If the processor 310 needs to reuse the instruction or the data, the processor 310 may directly invoke the instruction or the data from the memory. This avoids repeated access and reduces a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that, the interface connection relationship between the modules illustrated in this embodiment is merely an example for description, and does not constitute a limitation on a structure of the electronic device 300. In some other embodiments, the electronic device 300 may alternatively use different interface connection manners in the foregoing embodiments, or a combination of a plurality of interface connection manners.

The charging management module 340 is configured to receive a charging input from a charger. The charger may be a wireless charger or a wired charger. In some embodiments of wired charging, the charging management module 340 may receive a charging input from a wired charger through the USB port 330. In some embodiments of wireless charging, the charging management module 340 may receive a wireless charging input through a wireless charging coil of the electronic device 300. When charging the battery 342, the charging management module 340 may further supply power to the electronic device by using the power management module 341.

The power management module 341 is configured to connect to the battery 342, the charging management module 340, and the processor 310. The power management module 341 receives an input from the battery 342 and/or the charging management module 340, and supplies power to the processor 310, the internal memory 321, an external memory, the display 394, the camera 393, the wireless communications module 360, and the like. The power management module 341 may be further configured to monitor parameters such as a battery capacity, a quantity of battery cycles, and a battery health status (leakage and impedance). In some other embodiments, the power management module 341 may alternatively be disposed in the processor 310. In some other embodiments, the power management module 341 and the charging management module 340 may alternatively be disposed in a same component.

A wireless communications function of the electronic device 300 may be implemented through the antenna 1, the antenna 2, the mobile communications module 350, the wireless communications module 360, the modem processor, the baseband processor, and the like.

The antenna 1 and the antenna 2 are configured to transmit and receive electromagnetic wave signals. Each antenna in the electronic device 300 may be configured to cover one or more communications frequency bands. Different antennas may be further multiplexed, to improve antenna utilization. For example, the antenna 1 may be multiplexed as a diversity antenna in a wireless local region network. In some other embodiments, the antenna may be used in combination with a tuning switch.

The mobile communications module 350 may provide 2G, 3G, 4G, 5G, or another wireless communications solution that is applied to the electronic device 300. The mobile communications module 350 may include at least one filter, a switch, a power amplifier, a low noise amplifier (low noise amplifier, LNA), and the like. The mobile communications module 350 may receive an electromagnetic wave through the antenna 1, perform processing such as filtering and amplification on the received electromagnetic wave, and transmit a processed electromagnetic wave to the modem processor for demodulation. The mobile communications module 350 may further amplify a signal obtained after modulation by the modem processor, and convert the signal into an electromagnetic wave through the antenna 1 for radiation. In some embodiments, at least some functional modules of the mobile communications module 350 may be disposed in the processor 310. In some embodiments, at least some functional modules of the mobile communications module 350 and at least some modules of the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (not limited to the speaker 370A, the receiver 370B, or the like), or displays an image or a video on the display 394. In some embodiments, the modem processor may be an independent component. In some other embodiments, the modem processor may be independent of the processor 310, and disposed in a same component as the mobile communications module 350 or another functional module.

The wireless communications module 360 may provide a wireless communications solution that is applied to the electronic device 300, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (Near Field Communication, NFC), an infrared (infrared, IR) technology, and the like. The wireless communications module 360 may be one or more components integrating at least one communication processing module. The wireless communications module 360 receives an electromagnetic wave through the antenna 2, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert the signal into an electromagnetic wave through the antenna 2 for radiation.

In some embodiments, the antenna 1 of the electronic device 300 is coupled to the mobile communications module 350, and the antenna 2 thereof is coupled to the wireless communications module 360, so that the electronic device 300 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation systems, SBAS).

The electronic device 300 implements a display function by using the GPU, the display 394, the application processor, and the like. The GPU is a microprocessor for image processing, and is connected to the display 394 and the application processor. The GPU is configured to perform mathematical and geometric calculation, and render an image. The processor 310 may include one or more GPUs that execute program instructions to generate or change display information.

The display 394 is configured to display an image, a video, and the like. The display 394 is a touchscreen. The touchscreen is a curved screen with a radian on a side edge, or a foldable screen. The display 394 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The electronic device 300 may implement a photographing function by using the ISP, the camera 393, the video codec, the GPU, the display 394, the application processor, and the like.

The ISP is configured to process data fed back by the camera 393. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected onto a photosensitive element. The photosensitive element may be a charge-coupled device (charge-coupled device, CCD) or a complementary metal oxide semiconductor (complementary metal oxide semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in an RGB format, a YUV format, or the like. In some embodiments, the electronic device 300 may include one or N cameras 393, where N is a positive integer greater than 1.

The digital signal processor is configured to process a digital signal, and may further process another digital signal in addition to the digital image signal. For example, when the electronic device 300 performs frequency selection, the digital signal processor is configured to perform Fourier transform on frequency energy.

The video codec is configured to compress or decompress a digital video. The electronic device 300 may support one or more video codecs. In this way, the electronic device 300 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU may implement intelligent cognition of the electronic device 300 and other applications, for example, image recognition, facial recognition, speech recognition, and text understanding.

The external memory interface 320 may be configured to connect to an external memory card, for example, a micro-SD card, to expand a storage capability of the electronic device 300. The external memory card communicates with the processor 310 through the external memory interface 320, to implement a data storage function. For example, files such as music and a video are stored in the external memory card.

The internal memory 321 may be configured to store computer-executable program code, where the executable program code includes instructions. The processor 310 executes various function applications and data processing of the electronic device 300 by running the instructions stored in the internal memory 321. For example, in this embodiment of this application, the processor 310 may execute the instructions stored in the internal memory 321, and display corresponding display content on the display 384 (namely, a foldable screen) in response to a first operation or a second operation of the user on the display 394 (namely, a foldable screen). The internal memory 321 may include a program storage region and a data storage region. The program storage region may store an operating system, an application required by at least one function (for example, a voice playing function or an image playing function), and the like. The data storage region may store data (for example, audio data or a phone book) created in a process of using the electronic device 300. In addition, the internal memory 321 may include a high-speed random access memory, and may further include a nonvolatile memory, for example, at least one magnetic disk storage device, a flash memory, and a universal flash storage (universal flash storage, UFS). The electronic device 300 may implement an audio function, for example, music playing and recording, through the audio module 370, the speaker 370A, the receiver 370B, the microphone 370C, the headset jack 370D, the application processor, and the like.

The audio module 370 is configured to convert digital audio information into an analog audio signal for output, and is also configured to convert an analog audio input into a digital audio signal. The audio module 370 may be further configured to encode and decode audio signals. In some embodiments, the audio module 370 may be disposed in the processor 310, or some functional modules of the audio module 370 may be disposed in the processor 310. The speaker 370A, also referred to as a "loudspeaker", is configured to convert an audio electrical signal into a sound signal. The electronic device 300 may be used to listen to music or a hands-free call through the speaker 370A. The receiver 370B, also referred to as an "earpiece", is configured to convert an audio electrical signal into a sound signal. When the electronic device 300 receives a call or voice information, a voice may be received by placing the receiver 370B close to an ear. The microphone 370C, also referred to as a "mike" or "mic", is configured to convert a sound signal into an electrical signal. When making a call or sending voice information or triggering the electronic device 300 by using a voice assistant to perform some functions, the user may make a sound through a mouth by approaching the microphone 370C, and type the sound signal to the microphone 370C. The electronic device 300 may be provided with at least one microphone 370C. In some other embodiments, the electronic device 300 may be provided with two microphones 370C, so that a noise reduction function can be further implemented in addition to sound signal collection. In some other embodiments, the electronic device 300 may be alternatively provided with three, four, or more microphones 370C, to collect a sound signal, reduce noise, identify a sound source, implement a directional recording function, and the like.

The headset jack 370D is configured to connect to a wired headset. The headset jack 370D may be the USB port 330, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 380A is configured to sense a pressure signal and may convert the pressure signal into an electrical signal. In some embodiments, the pressure sensor 380A may be disposed in the display 394. There are many types of pressure sensors 380A, such as a resistive pressure sensor, an inductive pressure sensor, and a capacitive pressure sensor. The capacitive pressure sensor may include at least two parallel plates made of conductive materials. When a force is applied to the pressure sensor 380A, a capacitance between electrodes changes. The electronic device 300 determines pressure strength based on the change of the capacitance. When a touch operation acts on the display 394, the electronic device 300 detects strength of the touch operation based on the pressure sensor 380A. The electronic device 300 may also calculate a touch location based on a detection signal of the pressure sensor 380A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on a Messages icon, an instruction for creating an SMS message is executed.

The gyroscope sensor 380B may be configured to determine a motion posture of the electronic device 300. In some embodiments, an angular velocity of the electronic device 300 about three axes (namely, x, y, and z axes) may be determined by using the gyroscope sensor 380B. The gyroscope sensor 380B may be configured for stabilization during photographing. In this embodiment of this application, the display 394 (namely, a curved screen or a foldable screen) of the electronic device 300 may include a gyroscope sensor (for example, the gyroscope sensor 380B), configured to measure an orientation (namely, a direction vector of an orientation) of the display 334. The orientation of the display 334 may be used to determine an included angle between the display 334 and a horizontal plane. The electronic device may determine the included angle between adjacent screens based on the angular change of the orientation of each screen that is obtained through measurement.

The magnetic sensor 380D includes a Hall effect sensor. The electronic device 300 may detect opening or closure of a flip leather cover by using the magnetic sensor 380D. The acceleration sensor 380E may detect magnitudes of accelerations of the electronic device 300 in all directions (usually on three axes). When the electronic device 300 is still, the acceleration sensor 380E may detect a magnitude and a direction of gravity.

The distance sensor 380F is configured to measure a distance. The electronic device 300 may measure a distance by infrared or laser light. For example, in this embodiment of this application, the electronic device 300 may measure a distance between the electronic device 300 and a face by using the distance sensor 380F.

The optical proximity sensor 380G may include, for example, a light emitting diode (LED) and a light detector such as a photodiode. The light emitting diode may be an infrared light emitting diode. The electronic device 300 emits infrared light through the light emitting diode. The electronic device 300 uses the photodiode to detect infrared reflected light from a nearby object. When sufficient reflected light is detected, the electronic device 300 may determine that there is an object near the electronic device 300. When detecting insufficient reflected light, the electronic device 300 may determine that there is no object near the electronic device 300.

The ambient light sensor 380L is configured to perceive ambient light brightness. The electronic device 300 may adaptively adjust brightness of the display 394 based on the perceived ambient light brightness. The ambient light sensor 380L may also be configured to automatically adjust white balance during photographing. The ambient light sensor 380L may also cooperate with the optical proximity sensor 380G to detect whether the electronic device 300 is in a pocket, to avoid an accidental touch.

The fingerprint sensor 380H is configured to collect a fingerprint. The electronic device 300 may implement fingerprint unlocking, access to an application lock, fingerprint-based photographing, fingerprint-based call answering, and the like by using features of the collected fingerprint.

The temperature sensor 380J is configured to detect a temperature. In some embodiments, the electronic device 300 executes a temperature processing policy by using the temperature detected by the temperature sensor 380J. For example, when the temperature reported by the temperature sensor 380J exceeds a threshold, the electronic device 300 performs performance reduction on a processor located near the temperature sensor 380J, to reduce power consumption and perform thermal protection. In some other embodiments, when the temperature is lower than another threshold, the electronic device 300 heats the battery 342, to avoid abnormal shutdown of the electronic device 300 caused by the low temperature. In some other embodiments, when the temperature is lower than still another threshold, the electronic device 300 boosts an output voltage of the battery 342 to avoid abnormal shutdown caused by the low temperature.

The touch sensor 380K may also be referred to as a "touch panel". The touch sensor 380K may be disposed in the display 394, and the touch sensor 380K and the display 394 constitute a touchscreen, also called a "touch screen". The touch sensor 380K is configured to detect a touch operation acting on or near the touch sensor 380K. The touch sensor may transfer the detected touch operation to the application processor, to determine a type of a touch event. Visual output related to the touch operation may be provided on the display 394. In some other embodiments, the touch sensor 380K may alternatively be disposed on a surface of the electronic device 300, and a location of the touch sensor 380K is different from a location of the display 394.

The bone conduction sensor 380M may obtain a vibration signal. In some embodiments, the bone conduction sensor 380M may obtain a vibration signal of a human bone block for vocal vibration. The bone conduction sensor 380M may also come into contact with a pulse of a human body and receive a blood pressure pulse signal.

The button 390 includes a power button, a volume button, and the like. The button 390 may be a mechanical button, or may be a touch-sensitive button. The electronic device 300 may receive a button input to generate a button signal input related to user settings and function control of the electronic device 300. The motor 391 may generate a vibration prompt. The motor 391 may be configured for an incoming call vibration prompt, or may be configured for touch vibration feedback. The indicator 392 may be an indicator light, and may be configured to indicate a charging status and a power change, or may be configured to indicate a message, a missed call, a notification, and the like. The SIM card interface 395 is configured to connect to a SIM card. The SIM card may be inserted into or removed from the SIM card interface 395, to implement contact with and separation from the electronic device 300.

The methods in the following embodiments may be implemented in the electronic device 300 having the foregoing hardware structure.

Figure 4:
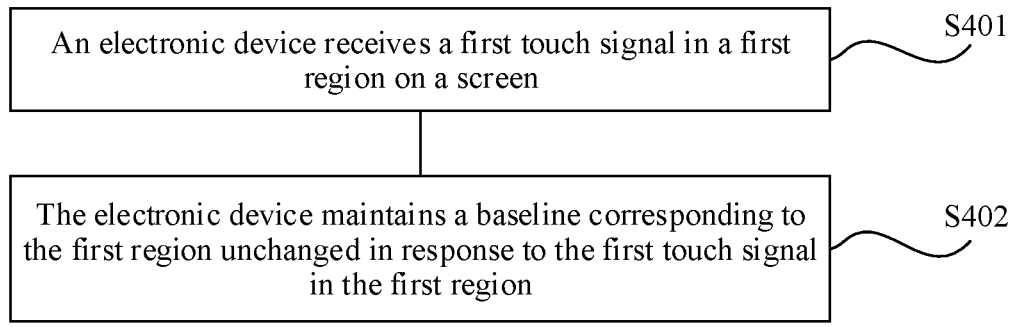
FIG. 4 is a schematic flowchart of a method for controlling a touchscreen according to an embodiment of this application.

With reference to FIG. 1(*a*) to FIG. 3, FIG. 4 shows a method for controlling a touchscreen according to an embodiment of this application. The method may be applied to the electronic device shown in FIG. 3. When the electronic device is held by a user, a region touched by a finger of the user is a touch region. Descriptions are provided in this embodiment by using an example in which the electronic device is a curved-screen phone. The method includes steps S401 and S402.

S401: The electronic device receives a first touch signal in a first region on the screen.

The screen of the electronic device includes the first region and a second region, the first region and the second region each correspond to a baseline (baseline), and the baseline corresponds to a capacitance value when a region corresponding to the baseline is not touched. For example, the first region corresponds to a first baseline. The first baseline corresponds to a capacitance value when the first region is not touched by a user. For example, when a finger of the user touches the first region, the electronic device detects a capacitance value of a capacitor, and subtracts the first baseline (baseline) from the capacitance value, to obtain rawdiff (rawdiff). When rawdiff exceeds a finger threshold (finger threshold), it may be determined that the finger touches the screen. Therefore, the baseline can be used to determine whether the screen of the electronic device is touched by the user. Optionally, finger thresholds set in the first region and the second region may be the same or different. This is not limited in this embodiment of this application.

Optionally, the screen of the electronic device may further include a region other than the first region and the second region, for example, a third region. It may be understood that the screen of the electronic device may be divided into at least two regions, the at least two regions may form the complete screen of the electronic device, and the at least two regions include the first region and the second region.

For example, the first touch signal may be a touch operation of the user or a touch signal obtained when the user holds the electronic device, for example, a touch signal obtained when the electronic device taps or slides the first region, or for another example, a touch signal obtained when the user touches the first region and the first region of the electronic device is held by the user. Descriptions are provided in the following embodiments only by using an example in which the first touch signal is the touch signal obtained when the user holds the electronic device.

For example, the regions do not overlap each other. For example, when the screen of the electronic device includes a first region and a second region, the first region and the second region do not overlap each other. For another example, when the screen of the electronic device includes a first region, a second region, and a third region, the first region, the second region, and the third region do not overlap each other.

For example, when the electronic device is a curved-screen phone with a radian on a side edge shown in FIG. 1(*a*) to FIG. 1(*c*), the screen of the electronic device may include a region of a main control screen and a region of a curved side screen. Alternatively, the screen of the electronic device may include a region of a main control screen, a region of a first side curved screen, and a region of a second side curved screen.

Figure 5A:
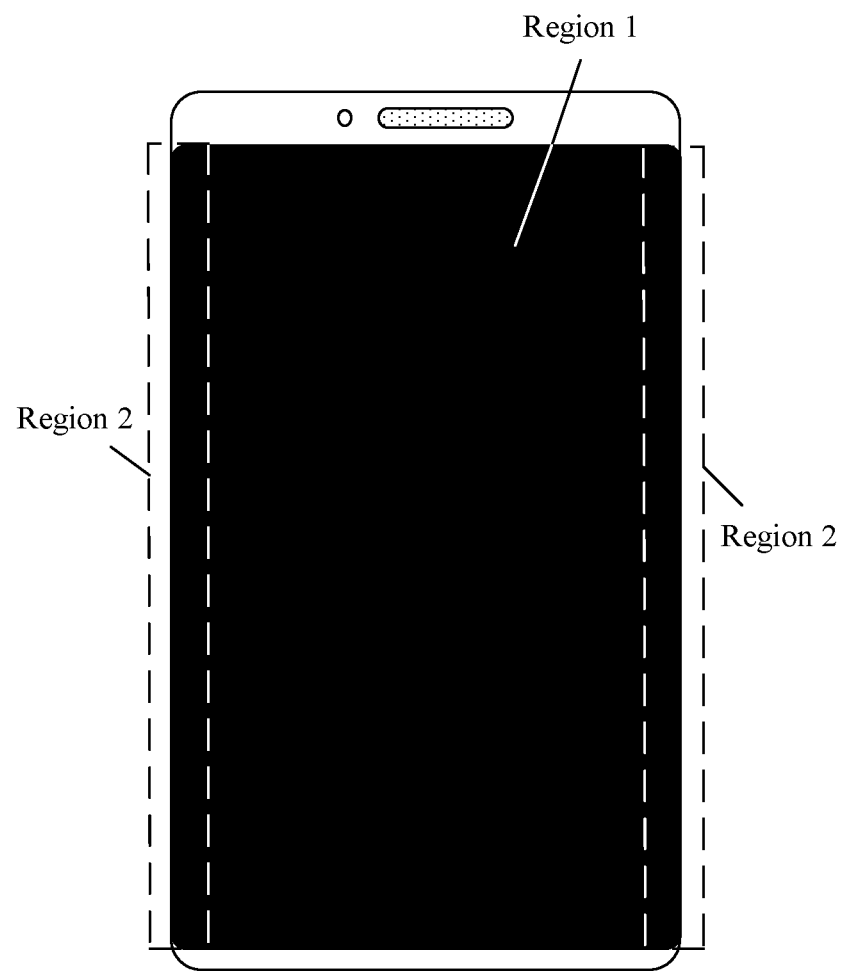
FIG. 5(a) and FIG. 5(b) are schematic diagrams of dividing regions of a curved phone according to an embodiment of this application.
Figure 5B:
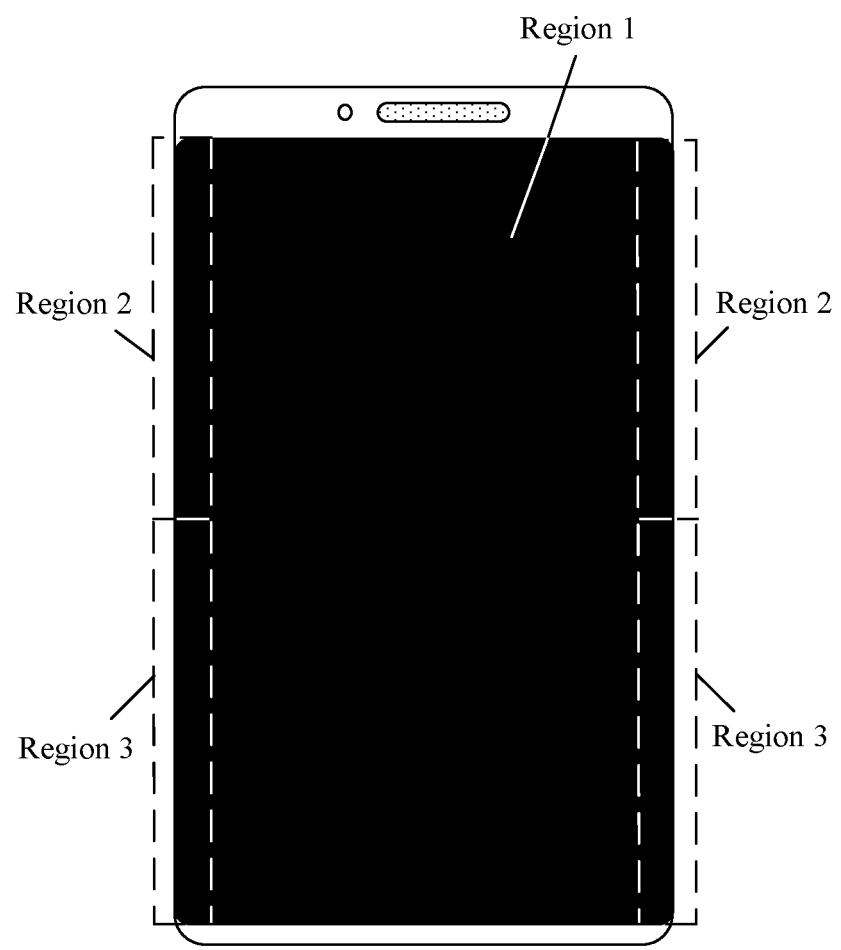

For example, as shown in FIG. 5(a), an electronic device may divide a screen of the curved-screen phone into two regions: a region 1 and a region 2. The region 1 is a region of a main control screen, and the region 2 is a region of a side curved screen. The first region is the region 1, and the second region is the region 2. For another example, as shown in FIG. 5(b), an electronic device may divide a screen of the curved-screen phone into three regions: a region 1, a region 2, and a region 3. The region 1 is a region of a main control screen, the region 2 is a region of a left-side curved screen, and the region 3 is a region of a right-side curved screen. The first region is the region 3, the second region is the region 1, and the third region is the region 2. A specific division principle of the screen of the electronic device is not limited in this embodiment of this application. Descriptions are provided herein by using FIG. 5(a) and FIG. 5(b) as an example.

For example, each region corresponds to one baseline. In other words, the electronic device may maintain a plurality of baselines. The plurality of baselines correspond to different regions respectively, and each region corresponds to one baseline. The screen division manner shown in FIG. 5(b) is used as an example. The electronic device may maintain three baselines: a baseline 1, a baseline 2, and a baseline 3. The region 1 corresponds to the baseline 1, the region 2 corresponds to the baseline 2, and the region 3 corresponds to the baseline 3.

It may be understood that, a difference between this embodiment and the conventional technology lies in that an electronic device in the conventional technology maintains only one baseline, while the electronic device in this embodiment may maintain the plurality of baselines, and each region maintains one baseline.

For example, the first region is a region touched by a hand of a user when the electronic device is held by the user. For example, the first region may be a region of a side curved screen, or the first region may be at least one of a region of a first side curved screen and a region of a second side curved screen.

Figure 6A:
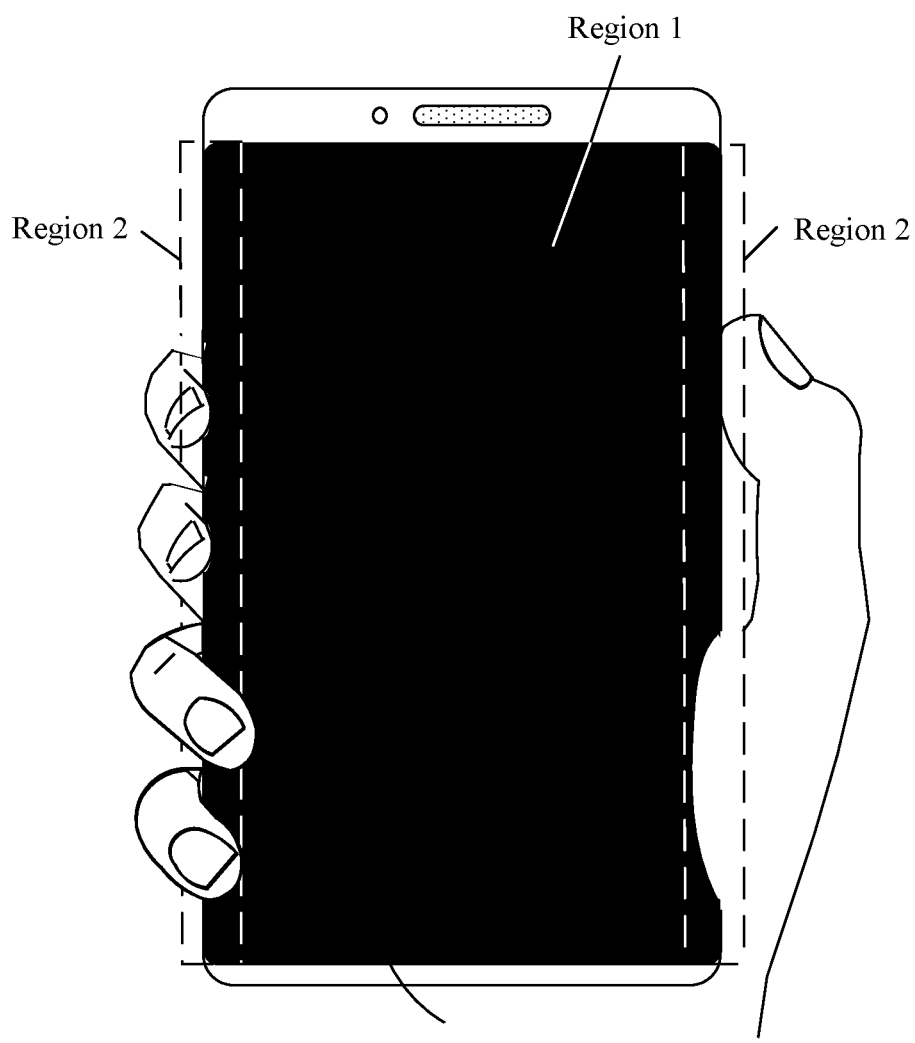
FIG. 6(a) and FIG. 6(b) are schematic diagrams of a curved phone being held by a user according to an embodiment of this application.

The region division manner shown in FIG. 5(a) is used as an example, as shown in FIG. 6(a). When a user holds an electronic device with a right hand, a tiger-mouth and a thumb of the right hand of the user are in contact with a radian region (a region 2) on the right side edge of the curved screen, and other fingers of the right hand of the user are in contact with a radian region (the region 2) on the left side edge of the curved screen. The region 2 is the first region.

Figure 6B:
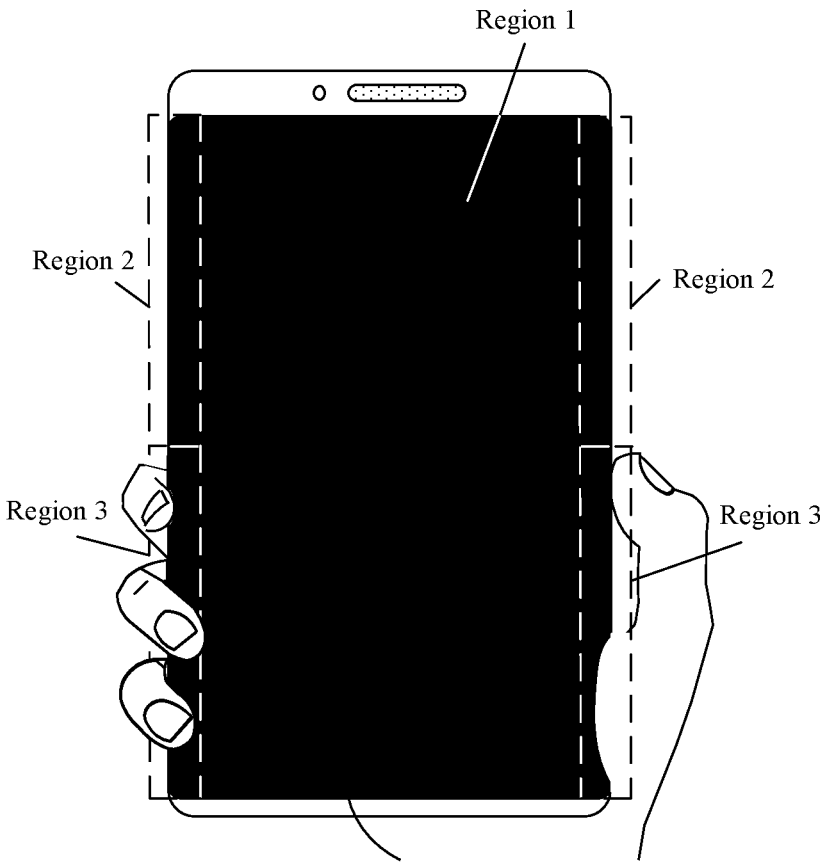

The region division manner shown in FIG. 5(b) is used as an example, as shown in FIG. 6(b). When a user holds the electronic device with a right hand, a tiger-mouth and a thumb of the right hand of the user are in contact with a radian region (a region 3) on the right side edge of the curved screen, and other fingers of the right hand of the user are in contact with a radian region (the region 3) on the left side edge of the curved screen. The region 3 is the first region.

For example, the electronic device may receive the first touch signal from the user in the first region (the region 2 in FIG. 6(a) or the region 3 in FIG. 6(b)).

S402: The electronic device maintains a baseline corresponding to the first region unchanged in response to the first touch signal in the first region.

The region division manner shown in FIG. 5(a) is used as an example. With reference to FIG. 6(a), the electronic device maintains a baseline corresponding to the first region (the region 2) unchanged in response to holding of the first region (the region 2) by the user. That is, the electronic device does not update the baseline 2 corresponding to the region 2 touched when the user holds the electronic device.

The region division manner shown in FIG. 5(b) is used as an example. With reference to FIG. 6(b), the electronic device maintains a baseline corresponding to the first region (the region 3) unchanged in response to a holding operation performed by the user in the first region (the region 3). That is, the electronic device does not update the baseline 3 corresponding to the region 3 touched when the user holds the electronic device.

It may be understood that, in this embodiment of this application, the plurality of baselines may be maintained, and each region corresponds to one baseline. When the user touches the first region, the electronic device does not update the baseline corresponding to the first region.

For example, as shown in FIG. 6(b), if the electronic device maintains only one baseline, when the user holds the region 3, the electronic device stops updating the baseline. When a capacitance value of a capacitor in the electronic device changes greatly with interference factors such as a temperature, humidity, and noise, because the baseline is stopped updating, after the user performs the touch operation in the region 1, rawdiff (rawdiff) between the capacitance value and the baseline may not exceed a finger threshold. As a result, the electronic device cannot identify the touch operation of the user. However, in this embodiment, three baselines are set for the three regions respectively. When the user holds the region 3, and the user performs the touch operation in the region 1, the electronic device does not update the baseline 3 corresponding to the region 3. Because the region 1 corresponds to the baseline 1 and the region 2 corresponds to the baseline 2, the electronic device does not update the baseline 3 corresponding to the region 3, which does not affect the baseline 1 corresponding to the region 1 and the baseline 2 corresponding to the region 2. For example, the electronic device may continue to update the baseline 1 corresponding to the region 1 and the baseline 2 corresponding to the region 2. Therefore, when the capacitance value of the capacitor in the region 1 changes greatly with interference factors such as a temperature, humidity, and noise, the baseline 1 corresponding to the region 1 is dynamically updated with the change of the capacitance value of the capacitor. Therefore, after the user performs the touch operation in the region 1, the electronic device can quickly identify the touch operation by comparing rawdiff (rawdiff) between the capacitance value and the baseline with the finger threshold.

According to the method for controlling a touchscreen provided in this embodiment of this application, the electronic device receives the first touch signal from the user in the first region on the screen. The screen of the electronic device includes the first region and the second region, each region corresponds to a baseline (baseline), and the baseline corresponds to a capacitance value when a region corresponding to the baseline is not touched. The electronic device maintains the baseline corresponding to the first region unchanged in response to the first touch signal in the first region. In this embodiment, the plurality of baselines are maintained, so that when holding the first region, the user stops updating the baseline corresponding to the first region, and because the second region corresponds to another baseline, when stopping updating the baseline corresponding to the first region touched by the user, the electronic device continues updating the baseline corresponding to the second region. In this way, the electronic device can quickly and accurately identify the touch operation performed by the user in the second region, thereby improving user experience.

Figure 7:
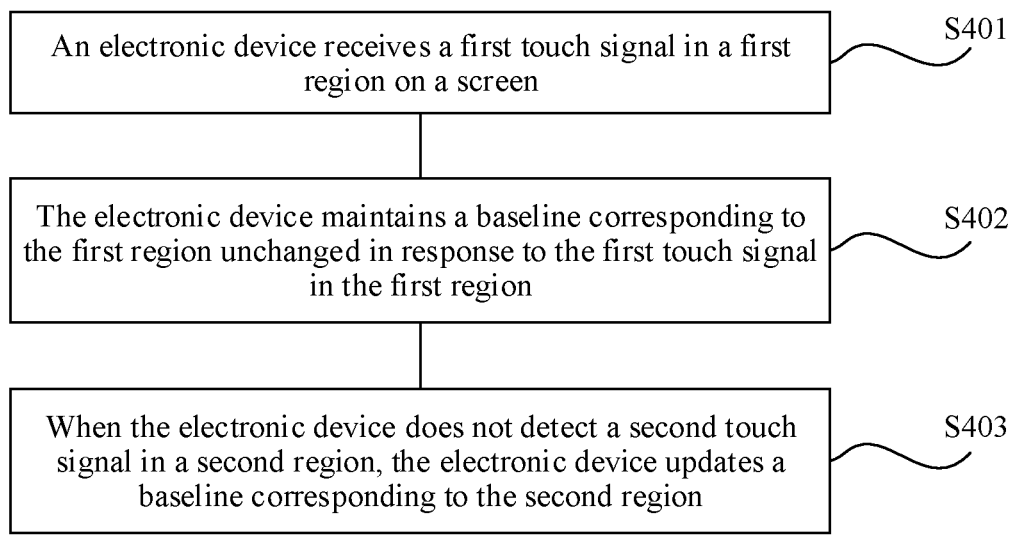
FIG. 7 is a schematic flowchart of another method for controlling a touchscreen according to an embodiment of this application.

For example, an embodiment of this application further provides a method for controlling a touchscreen. As shown in FIG. 7, on the basis of steps S401 and S402, the method may further include S403.

S403: When the electronic device does not detect a second touch signal in the second region, the electronic device updates a baseline corresponding to the second region.

For example, the second touch signal may be a touch operation performed by the user in the second region, for example, a tap operation or a slide operation.

The region division manner shown in FIG. 5(a) is used as an example. With reference to FIG. 6(a), the electronic device maintains the baseline corresponding to the first region (the region 2) unchanged in response to touching from the user in the first region (the region 2). When the electronic device does not detect a touch signal in a second region (the region 1), the electronic device updates a baseline corresponding to the second region (the region 1). That is, the electronic device does not update the baseline 2 corresponding to the region 2 touched by the user, but updates the baseline 1 corresponding to the region 1 not touched by the user.

For example, when the screen of the electronic device includes a first region, a second region, and a third region, step S403 may be further extended as: When the electronic device does not detect a second touch signal in the second region and a third touch signal in the third region, the electronic device updates a baseline corresponding to the second region and a baseline corresponding to the third region separately. That is, when the user does not touch the second region and the third region, the electronic device may update the baseline corresponding to the second region and the baseline corresponding to the third region respectively.

The region division manner shown in FIG. 5(b) is used as an example. With reference to FIG. 6(b), the electronic device maintains the baseline corresponding to the first region (the region 3) unchanged in response to a touching operation performed by the user in the first region (the region 3). When the electronic device does not detect a touch signal in the second region (the region 1) and a touch signal in the third region (the region 2), the electronic device updates a baseline corresponding to the second region (the region 1) and a baseline corresponding to the third region (the region 2) respectively. That is, the electronic device does not update the baseline 3 corresponding to the region 3 touched by the user, but updates the baseline baseline 1 corresponding to the region 1 not touched by the user and the baseline baseline 2 corresponding to the region 2 not touched by the user.

Optionally, a union set between the region 1 and the region 2 in FIG. 5(b) may also be used as the second region.

It may be understood that, in this embodiment of this application, the plurality of baselines may be maintained, and each region corresponds to one baseline. When the user touches the first region, the electronic device does not update the baseline corresponding to the first region. When the user does not touch the second region, the electronic device updates the baseline corresponding to the second region. In this way, when the user touches the first region, because the baseline corresponding to the second region is dynamically updated with a capacitance value of a capacitor in the second region, when the user performs a touch operation in the second region again, the electronic device can sensitively identify the touch operation performed by the user in the second region.

For example, as shown in FIG. 6(b), if the electronic device maintains only one baseline, when the user holds the region 3, the electronic device stops updating the baseline. When a capacitance value of a capacitor in the electronic device changes greatly with interference factors such as a temperature, humidity, and noise, because the baseline is stopped updating, after the user performs the touch operation in the region 1, rawdiff (rawdiff) between the capacitance value and the baseline may not exceed a finger threshold. As a result, the electronic device cannot identify the touch operation of the user. However, in this embodiment, three baselines are set for the three regions respectively. When the user holds the region 3, the electronic device does not update the baseline 3 corresponding to the region 3, but updates the baseline 1 corresponding to the region 1 and the baseline 2 corresponding to the region 2. Therefore, when the capacitance value of the capacitor in the region 1 changes greatly with interference factors such as a temperature, humidity, and noise, the baseline 1 corresponding to the region 1 is dynamically updated with the change of the capacitance value of the capacitor. Therefore, after the user performs the touch operation in the region 1, the electronic device can quickly identify the touch operation by comparing rawdiff (rawdiff) between the capacitance value and the baseline with the finger threshold.

Optionally, update principles for the electronic device to update the baseline corresponding to the region 1 and the baseline corresponding to the region 2 may be the same. The baseline 1 corresponding to the region 1 and the baseline 2 corresponding to the region 2 are dynamically updated as changes of the capacitance value of the region 1 and the capacitance value of the region 2 respectively, so that when the user performs a touch operation in each of the region 1 and the region 2, the region 1 and the region 2 can identify the touch operation of the user.

According to the method for controlling a touchscreen provided in this embodiment of this application, the electronic device receives the first touch signal from the user in the first region on the screen. The screen of the electronic device includes the first region and the second region, each region corresponds to a baseline (baseline), and the baseline corresponds to a capacitance value when a region corresponding to the baseline is not touched. The electronic device maintains the baseline corresponding to the first region unchanged in response to the first touch signal in the first region. When the electronic device does not detect the second touch signal in the second region, the electronic device updates the baseline corresponding to the second region. In this embodiment, the plurality of baselines are maintained, so that the baseline corresponding to the first region can be stopped updating when the user touches the first region, and when the user does not touch the second region, the baseline corresponding to the second region is updated. In this way, the electronic device can quickly and accurately identify the touch operation performed by the user in the second region, thereby improving user experience.

Figure 8:
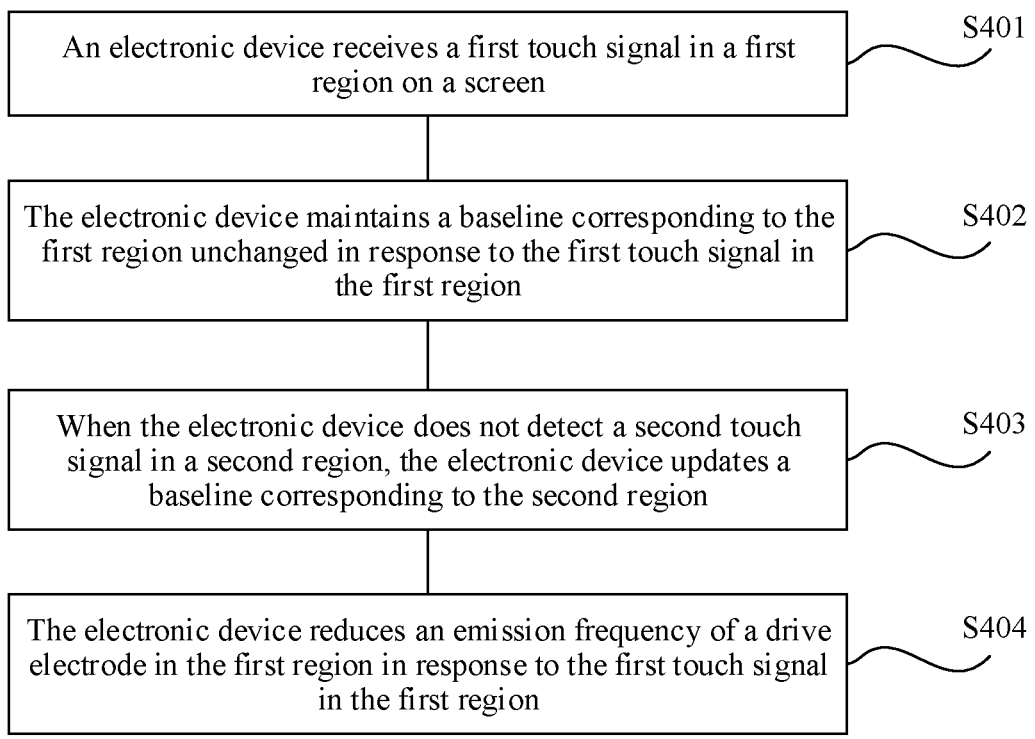
FIG. 8 is a schematic flowchart of another method for controlling a touchscreen according to an embodiment of this application.

For example, an embodiment of this application further provides a method for controlling a touchscreen. As shown in FIG. 8, in addition to steps S401 to S403, the method may further include step S404.

S404: The electronic device reduces an emission frequency of a drive electrode in the first region in response to the first touch signal in the first region.

For example, with reference to FIG. 6(b), in response to holding the first region (the region 3) by the user, the electronic device may reduce a frequency at which a drive electrode in the first region sends an excitation signal, thereby reducing power consumption of the screen.

Figure 9:
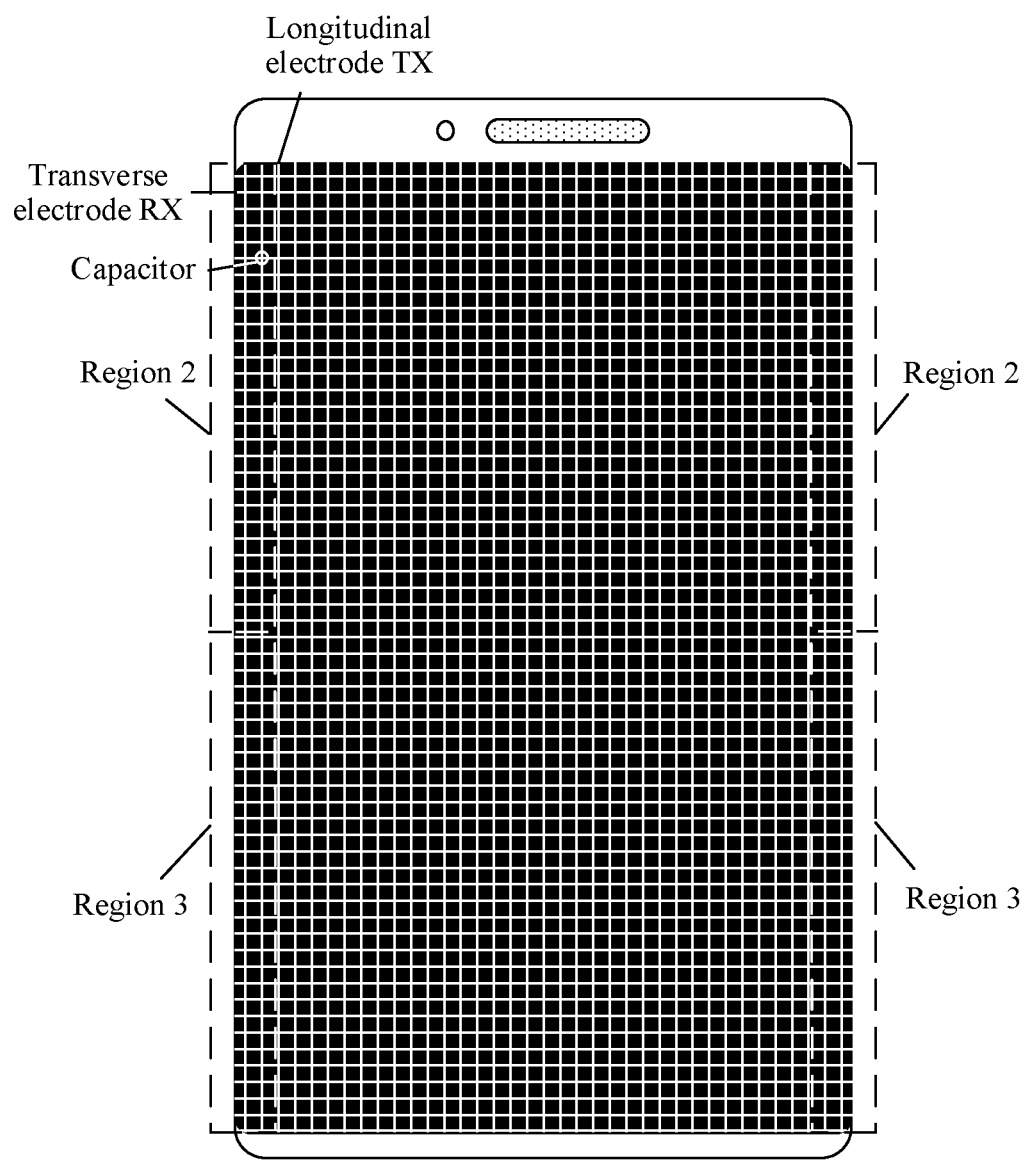
FIG. 9 is a schematic diagram of a touch principle of a curved phone according to an embodiment of this application.

For example, as shown in FIG. 9, a capacitor is formed at a place where a transverse electrode intersects a longitudinal electrode on a screen of an electronic device. The foregoing drive electrode may be the longitudinal electrode in FIG. 9, or may be the transverse electrode in FIG. 9. When the drive electrode is the longitudinal electrode, a receive electrode is the transverse electrode. When the drive electrode is the transverse electrode, a receive electrode is the longitudinal electrode. The drive electrode sequentially emits excitation signals, and the receive electrode receives the signals. Capacitance values at intersection points of all the transverse electrodes and all the longitudinal electrodes can be obtained. A direction of the drive electrode and a direction of the receive electrode of the electronic device are not limited in this embodiment. Descriptions are provided herein by using an example in which the drive electrode is the longitudinal electrode and the receive electrode is the transverse electrode in the screen of the electronic device shown in FIG. 9.

For example, as shown in FIG. 9, when a user holds a region 3, in response to the first touch signal from the user in the region 3, the electronic device may reduce a frequency at which a drive electrode in the region 3 sends an excitation signal, that is, the electronic device reduces a frequency at which a longitudinal electrode in the region 3 in FIG. 9 sends the excitation signal, thereby reducing power consumption of the screen of the electronic device. For example, when the user holds the region 3, the electronic device may reduce the emission frequency of the longitudinal electrode in the region 3 from 120 Hz to 30 Hz or even lower, thereby reducing overall power consumption of the screen. This embodiment of this application sets no limitation on an amplitude of the decrease in the frequency of the drive electrode, and is merely an example for description herein.

According to the method for controlling a touchscreen provided in this embodiment of this application, the electronic device receives the first touch signal from the user in the first region on the screen. The screen of the electronic device includes the first region and the second region, each region corresponds to a baseline (baseline), and the baseline corresponds to a capacitance value when a region corresponding to the baseline is not touched. The electronic device maintains the baseline corresponding to the first region unchanged in response to the first touch signal in the first region. When the electronic device does not detect the second touch signal in the second region, the electronic device updates the baseline corresponding to the second region. The electronic device reduces the emission frequency of the drive electrode in the first region in response to the first touch signal in the first region. In this embodiment, the plurality of baselines are maintained, so that the baseline corresponding to the first region can be stopped updating when the user touches the first region, and when the user does not touch the second region, the baseline corresponding to the second region is updated. In this way, the electronic device can quickly and accurately identify the touch operation performed by the user in the second region, thereby improving user experience. In addition, the emission frequency of the drive electrode in the first region is reduced in this embodiment, so that power consumption of the screen of the electronic device can be reduced.

Figure 10:
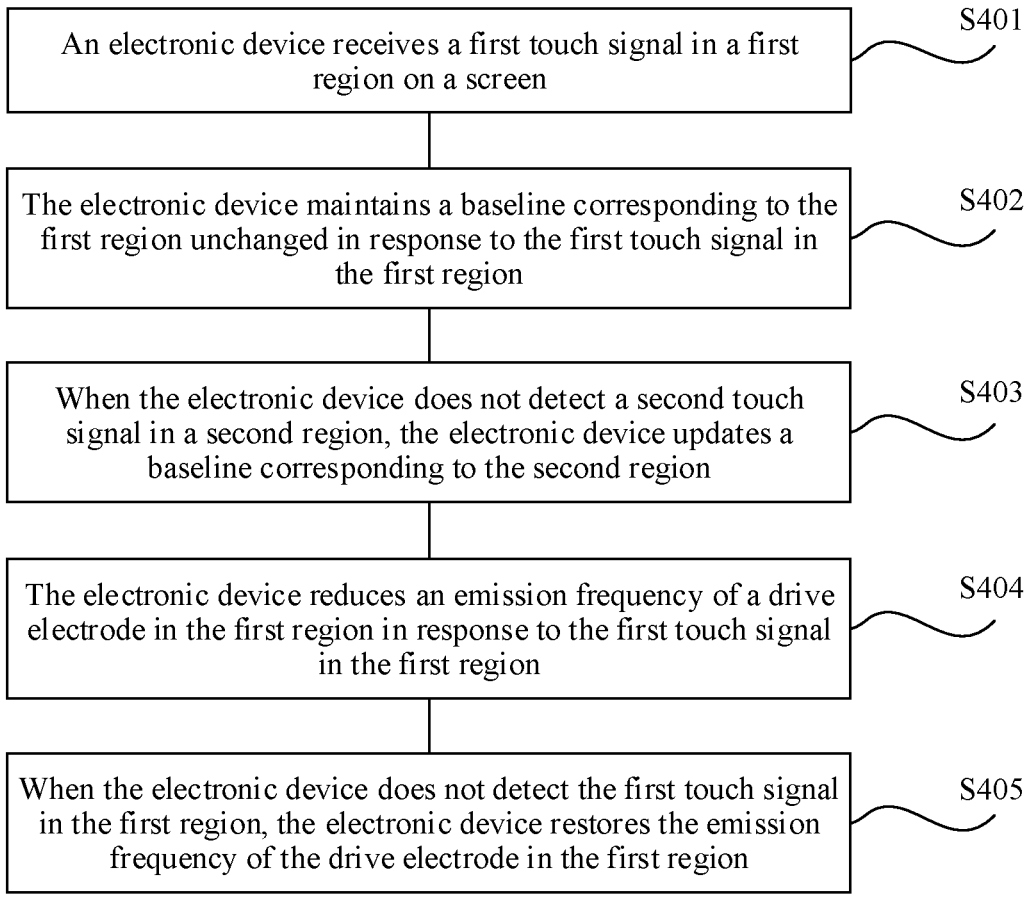
FIG. 10 is a schematic flowchart of another method for controlling a touchscreen according to an embodiment of this application.

Optionally, as shown in FIG. 10, after steps S401 to S404, the method for controlling a touchscreen may further include step S405.

S405: When the electronic device does not detect the first touch signal in the first region, the electronic device restores the emission frequency of the drive electrode in the first region.

For example, when the user no longer touches the first region, the electronic device may restore the emission frequency of the drive electrode in the first region to a normal frequency. For example, when the user no longer holds the region 3, the emission frequency of the drive electrode in the region 3 is restored to 120 Hz, so as to ensure that when the user touches the region 3 again, the electronic device can quickly identify the touch operation of the user.

According to the method for controlling a touchscreen provided in this embodiment of this application, the electronic device receives the first touch signal from the user in the first region on the screen. The screen of the electronic device includes the first region and the second region, each region corresponds to a baseline (baseline), and the baseline corresponds to a capacitance value when a region corresponding to the baseline is not touched. The electronic device maintains the baseline corresponding to the first region unchanged in response to the first touch signal in the first region. When the electronic device does not detect the second touch signal in the second region, the electronic device updates the baseline corresponding to the second region. The electronic device reduces the emission frequency of the drive electrode in the first region in response to the first touch signal in the first region. When the first region is not held by the user, the electronic device restores the emission frequency of the drive electrode in the first region. In this embodiment, the plurality of baselines are maintained, so that the baseline corresponding to the first region can be stopped updating when the user touches the first region, and when the user does not touch the second region, the baseline corresponding to the second region is updated. In this way, the electronic device can quickly and accurately identify the touch operation performed by the user in the second region, thereby improving user experience. In addition, in this embodiment, when the user touches the first region, the emission frequency of the drive electrode in the first region is reduced, so that power consumption of the screen of the electronic device can be reduced. When the user no longer touches the first region, the emission frequency of the drive electrode in the first region is restored. Therefore, it can be ensured that when the user touches the first region again, the electronic device can quickly identify the touch operation performed by the user in the first region.

Figure 11:
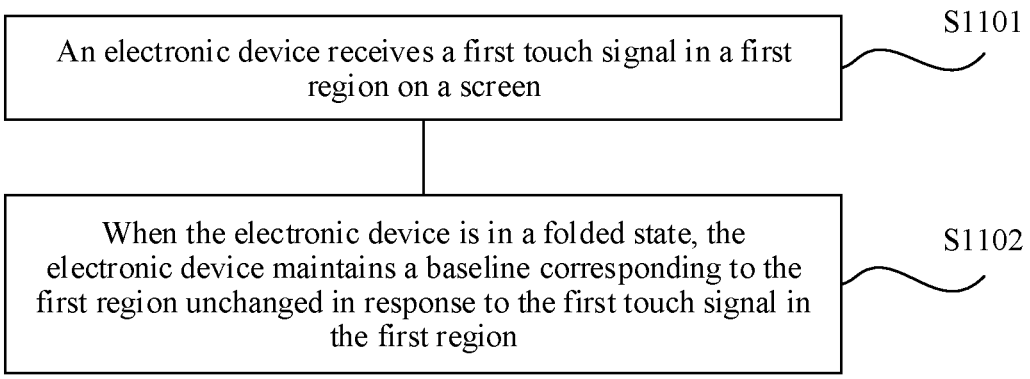
FIG. 11 is a schematic flowchart of another method for controlling a touchscreen according to an embodiment of this application.

An embodiment of this application provides another method for controlling a touchscreen. The method may be applied to a foldable electronic device. As shown in FIG. 11, the method for controlling a touchscreen includes steps S1101 and S1102.

S1101: The electronic device receives a first touch signal in a first region on the screen.

The screen of the electronic device includes the first region and a second region, when the electronic device is in a folded state, the first region and the second region each correspond to a baseline (baseline), and the baseline corresponds to a capacitance value when a region corresponding to the baseline is not touched. For related descriptions of the baseline and the first touch signal, refer to step S401. Details are not described herein again.

Figure 12:
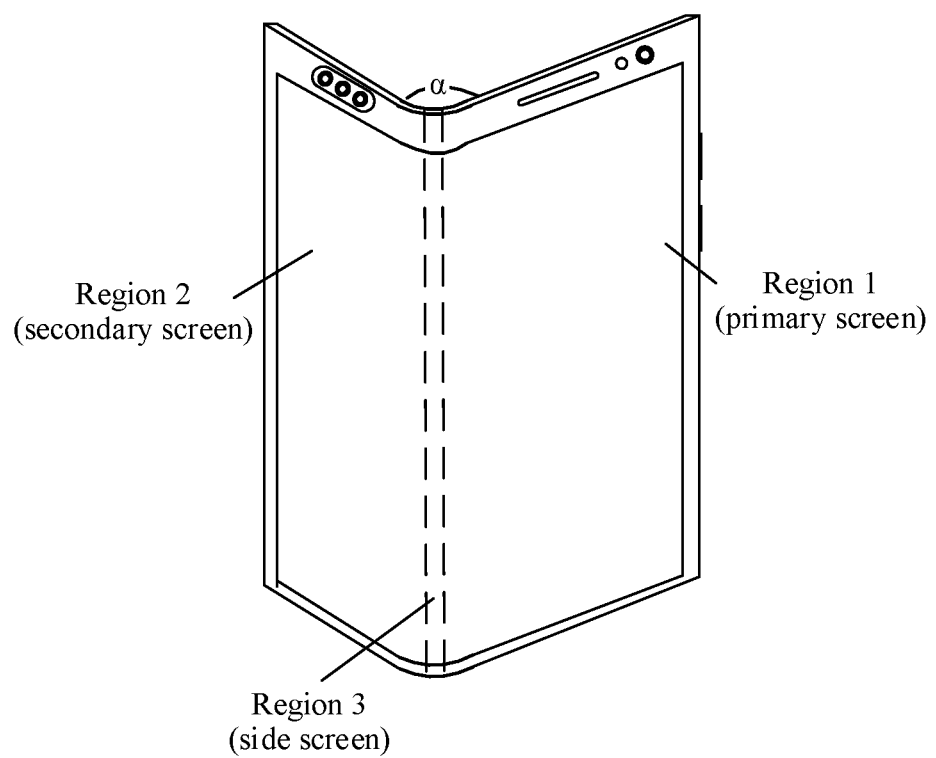
FIG. 12 is a schematic diagram of dividing regions of a foldable phone according to an embodiment of this application.

For example, the regions do not overlap each other. The screen of the electronic device may include a region of a primary screen, a region of a secondary screen, and a region of a side screen. For example, as shown in FIG. 12, an electronic device may divide a screen of a foldable-screen phone into three regions: a region 1, a region 2, and a region 3. The region 1 is a region of a primary screen, the region 2 is a region of a secondary screen, and the region 3 is a region of a side screen. A division principle of at least two regions is not limited in this embodiment of this application. Descriptions are provided herein by using FIG. 12 as an example. The first region may be at least one of the region of a primary screen, the region of a secondary screen, and the region of a side screen.

For example, the folded state that the electronic device is in is a state in which an included angle between the primary screen and the secondary screen of the electronic device is less than a first preset angle threshold. For example, the first preset angle threshold is 30°. As shown in FIG. 12, a state in which an included angle α between the primary screen and the secondary screen of the electronic device is less than 30° is a folded state. It may be understood that the electronic device may determine the included angle between the primary screen and the secondary screen by using the gyroscope sensor 380B and/or the acceleration sensor 380E in FIG. 3. For example, the electronic device may separately measure orientations (namely, direction vectors of the orientations) of the primary screen and the secondary screen by using gyroscope sensors in the primary screen and the secondary screen, and then may determine the included angle between the primary screen and the secondary screen based on angle changes of the orientations of the primary screen and the secondary screen obtained through measurement. A specific value of the first preset angle threshold is not limited in this embodiment of this application, and descriptions are provided herein only by using 30° as an example.

For example, as shown in FIG. 12, when the electronic device is in the folded state, each region corresponds to one baseline. In other words, when the electronic device is in the folded state, the electronic device may maintain a plurality of baselines. The plurality of baselines correspond to different regions respectively, and each region corresponds to one baseline. For example, the at least two regions are divided in the division manner shown in FIG. 12. The electronic device may maintain three baselines: a baseline 1, a baseline 2, and a baseline 3. The region 1 corresponds to the baseline 1, the region 2 corresponds to the baseline 2, and the region 3 corresponds to the baseline 3.

It may be understood that, a difference between this embodiment and the conventional technology lies in that an electronic device in the conventional technology maintains only one baseline, while in this embodiment, when the electronic device is in the folded state, the electronic device may maintain the plurality of baselines, and each region maintains one baseline.

Figure 13:
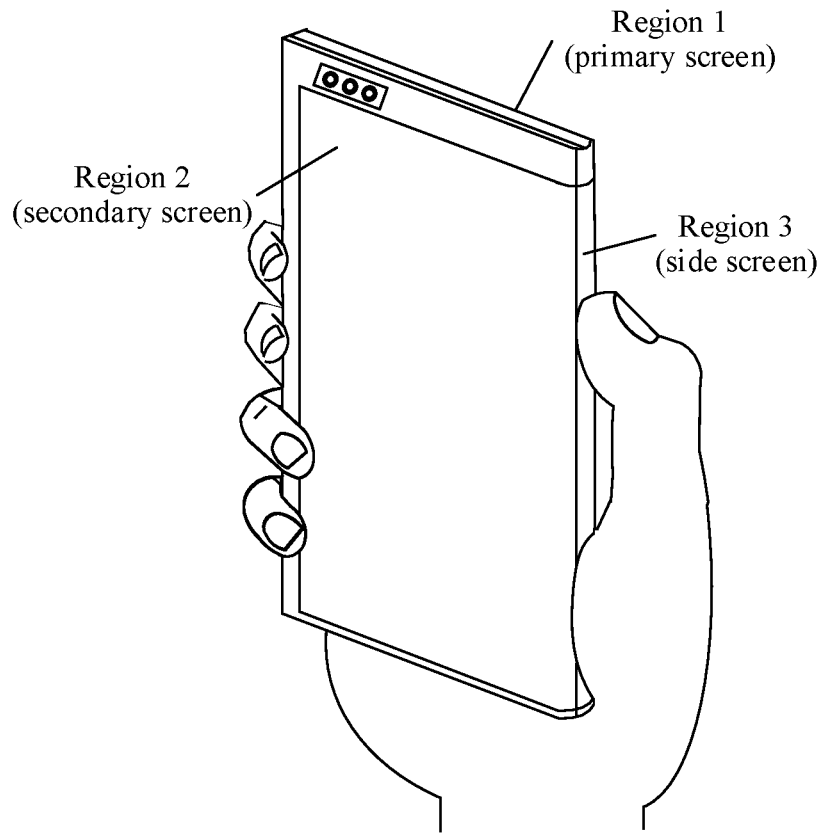
FIG. 13 is a schematic diagram of a foldable phone being held by a user according to an embodiment of this application.

As shown in FIG. 13, when a user holds an electronic device with a right hand, a tiger mouth and a thumb of the right hand of the user are in contact with a region (a region 3) of a side screen of the foldable-screen phone, and a palm of the right hand of the user is in contact with a region (a region 1) of a primary screen of the foldable-screen phone. That is, the first region is the region 1 and the region 3.

For example, the electronic device may receive the first touch signal from the user in the first region (the region 1 and the region 3 in FIG. 13).

S1102: When the electronic device is in the folded state, the electronic device maintains a baseline corresponding to the first region unchanged in response to the first touch signal in the first region.

For example, as shown in FIG. 13, when the electronic device is in the folded state, the electronic device maintains the baseline corresponding to the first region (the region 1 and the region 3) unchanged in response to the first touch signal from the user in the first region (the region 1 and the region 3). That is, the electronic device does not update the baseline 1 corresponding to the region 1 and the baseline 3 corresponding to the region 3 that are held by the user.

It may be understood that in this embodiment, when the electronic device is in the folded state, a plurality of baselines may be maintained. When the user holds the first region, the electronic device does not update the baseline corresponding to the first region.

For example, as shown in FIG. 13, if the electronic device maintains only one baseline, when the user holds the region 1 and the region 3, the electronic device stops updating the baselines. When a capacitance value of a capacitor in the electronic device changes greatly with interference factors such as a temperature, humidity, and noise, because the baseline is stopped updating, after the user performs the touch operation (for example, a tap operation or a slide operation) in the region 2, rawdiff (rawdiff) between the capacitance value and the baseline may not exceed a finger threshold. As a result, the electronic device cannot identify the tap operation of the user. However, in this embodiment, three baselines are set for the three regions respectively. When the user holds the region 1 and the region 3, the electronic device does not update the baseline 1 corresponding to the region 1 and the baseline 3 corresponding to the region 3. Because the baseline 2 corresponds to the region 2, the electronic device does not update the baseline 2, but update the baseline 1 corresponding to the region 1 and the baseline 3 corresponding to the region 3, which does not affect the baseline 2 corresponding to the region 2. For example, the electronic device may continue to update the baseline 2 corresponding to the region 2, so that when a capacitance value of a capacitor in the region 2 changes greatly with interference factors such as a temperature, humidity, and noise, because the baseline 2 corresponding to the region 2 is dynamically updated with the change of the capacitance value, after the user performs the touch operation in the region 2, the electronic device can quickly identify a touch operation by comparing rawdiff (rawdiff) between the capacitance value and the baseline with a finger threshold.

According to the method for controlling a touchscreen provided in this embodiment of this application, the electronic device receives the first touch signal from the user in the first region on the screen. The screen of the electronic device includes the first region and the second region, when the electronic device is in the folded state, each region corresponds to a baseline, and the baseline corresponds to a capacitance value when a region corresponding to the baseline is not touched. When the electronic device is in the folded state, the electronic device maintains the baseline corresponding to the first region unchanged in response to the first touch signal in the first region. In this embodiment, a plurality of baselines are maintained when the electronic device is in the folded state, so that when holding the first region, the user stops updating the baseline corresponding to the first region, and because the second region corresponds to another baseline, when stopping updating the baseline corresponding to the first region touched by the user, the electronic device continues updating the baseline corresponding to the second region. In this way, the electronic device can quickly and accurately identify a touch operation performed by the user in the second region, thereby improving user experience.

Figure 14:
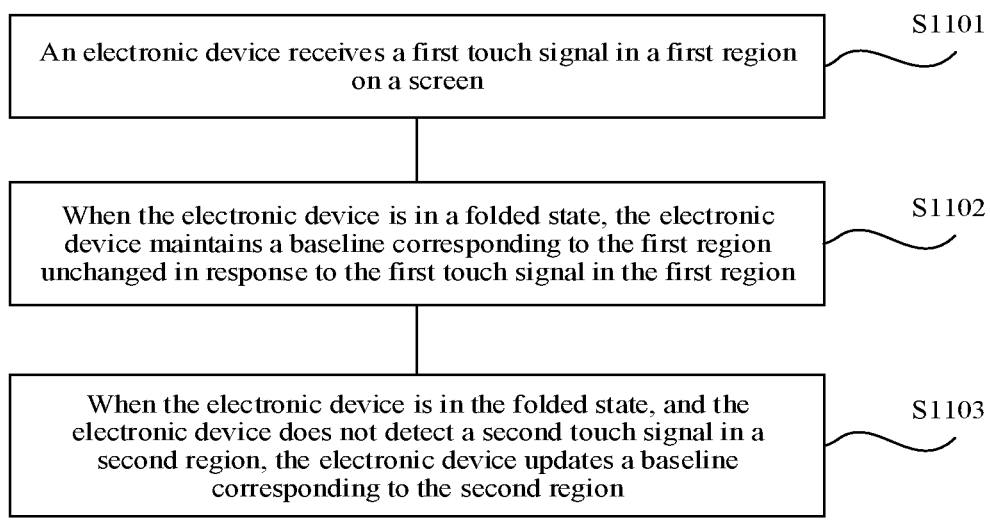
FIG. 14 is a schematic flowchart of another method for controlling a touchscreen according to an embodiment of this application.

For example, an embodiment of this application further provides a method for controlling a touchscreen. As shown in FIG. 14, on the basis of steps S1101 and S1102, the method may further include S1103.

S1103: When the electronic device is in the folded state, when the electronic device does not detect a second touch signal in the second region, the electronic device updates a baseline corresponding to the second region.

For example, the second touch signal may be a touch operation performed by the user in the second region, for example, a tap operation or a slide operation.

For example, as shown in FIG. 13, when the electronic device is in the folded state, the electronic device maintains the baseline corresponding to the first region (the region 1 and the region 3) unchanged in response to the first touch signal from the user in the first region (the region 1 and the region 3). When the electronic device does not detect a touch signal in the second region (the region 2), the electronic device updates a baseline corresponding to the second region (the region 2). That is, the electronic device does not update the baseline 1 corresponding to the region 1 touched by the user and the baseline 3 corresponding to the region 3 touched by the user, but updates the baseline 2 corresponding to the region 2 not touched by the user.

It may be understood that in this embodiment, a plurality of baselines may be maintained when the electronic device is in the folded state. When the user touches the first region, the electronic device does not update the baseline corresponding to the first region. When the user does not touch the second region, the electronic device updates the baseline corresponding to the second region. In this way, when the user touches the first region, because the baseline corresponding to the second region is dynamically updated with a capacitance value of a capacitor in the second region, when the user performs an operation in the second region again, the electronic device can sensitively identify the touch operation performed by the user in the second region.

For example, as shown in FIG. 13, when the user holds the electronic device (the user holds the region 1 and the region 3), if the electronic device maintains only one baseline, when the user holds the region 1 and the region 3, the electronic device stops updating the baselines. When a capacitance value of a capacitor in the electronic device changes greatly with interference factors such as a temperature, humidity, and noise, because the baseline is stopped updating, after the user performs a touch operation in the region 2, rawdiff (rawdiff) between the capacitance value and the baseline may not exceed a finger threshold. As a result, the electronic device cannot identify the tap operation of the user. However, in this embodiment, three baselines are set for the three regions respectively. When the user holds the region 1 and the region 3, the electronic device does not update the baseline 1 corresponding to the region 1 and the baseline 3 corresponding to the region 3, but updates the baseline 2 corresponding to the region 2, so that when a capacitance value of a capacitor in the region 2 changes greatly with interference factors such as a temperature, humidity, and noise, because the baseline 2 corresponding to the region 2 is dynamically updated with the change of the capacitance value, after the user performs a touch operation in the region 2, the electronic device can quickly identify a touch operation by comparing rawdiff (rawdiff) between the capacitance value and the baseline with a finger threshold.

According to the method for controlling a touchscreen provided in this embodiment of this application, the electronic device receives the first touch signal from the user in the first region on the screen. The screen of the electronic device includes the first region and the second region, when the electronic device is in the folded state, each region corresponds to a baseline, and the baseline corresponds to a capacitance value when a region corresponding to the baseline is not touched. When the electronic device is in the folded state, the electronic device maintains the baseline corresponding to the first region unchanged in response to the first touch signal in the first region. When the electronic device is in the folded state, and the electronic device does not detect the second touch signal in the second region, the electronic device updates the baseline corresponding to the second region. In this embodiment, the plurality of baselines are maintained when the electronic device is in the folded state, so that the baseline corresponding to the first region can be stopped updating when the user holds the first region, and when the user does not touch the second region, the baseline corresponding to the second region is updated. In this way, the electronic device can quickly and accurately identify a touch operation performed by the user in the second region, thereby improving user experience.

Figure 15:
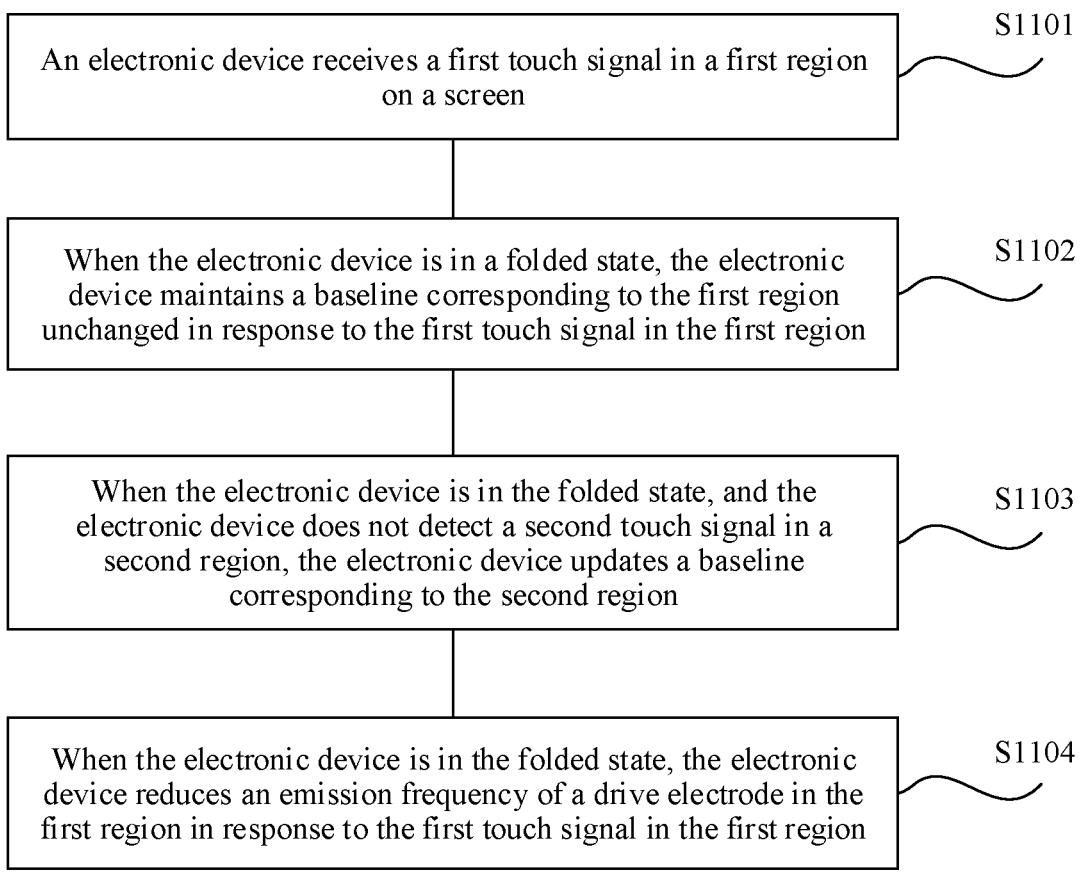
FIG. 15 is a schematic flowchart of another method for controlling a touchscreen according to an embodiment of this application.

For example, an embodiment of this application further provides a method for controlling a touchscreen. As shown in FIG. 15, on the basis of steps S1101 to S1103, the method may further include S1104.

S1104: When the electronic device is in the folded state, the electronic device reduces an emission frequency of a drive electrode in the first region in response to the first touch signal in the first region.

For example, as shown in FIG. 13, when the electronic device is in the folded state, the electronic device may reduce, in response to the first touch signal from the user in the first region (the region 1 and the region 3), frequencies at which a drive electrode in the region 1 and a drive electrode in the region 3 emit excitation signals, thereby reducing power consumption of the screen.

For example, a capacitor is formed at a place where a transverse electrode intersects a longitudinal electrode on a screen of an electronic device. The foregoing drive electrode may be the longitudinal electrode, or may be the transverse electrode. When the drive electrode is the longitudinal electrode, a receive electrode is the transverse electrode. When the drive electrode is the transverse electrode, a receive electrode is the longitudinal electrode. The drive electrode sequentially emits excitation signals, and the receive electrode receives the signals. Capacitance values at intersection points of all the transverse electrodes and all the longitudinal electrodes can be obtained. A direction of the drive electrode and a direction of the receive electrode of the electronic device are not limited in this embodiment. Descriptions are provided herein by using an example in which the drive electrode is the longitudinal electrode and the receive electrode is the transverse electrode in the screen of the electronic device.

For example, as shown in FIG. 13, when the electronic device is in the folded state, when the user holds the region 1 and the region 3, the electronic device may reduce, in response to the first touch signal from the user in the region 1 and the region 3, frequencies at which the drive electrode in the region 1 and the drive electrode in the region 3 emit excitation signals. That is, the electronic device reduces frequencies at which a longitudinal electrode in the region 1 and a longitudinal electrode in the region 3 emit excitation signals, thereby reducing power consumption of the screen of the electronic device. For example, when the user touches the region 1 and the region 3, the electronic device may reduce the emission frequencies of the longitudinal electrode in the region 1 and the longitudinal electrode in the region 3 from 120 Hz to 30 Hz or even lower, thereby reducing overall power consumption of the screen. This embodiment of this application sets no limitation on an amplitude of the decrease in the frequency of the drive electrode, and is merely an example for description herein.

Optionally, the electronic device may also stop scanning of the drive electrode in the region 1 and the drive electrode in the region 3. When the electronic device is in an unfolded state, or when the user no longer holds the electronic device, scanning of the drive electrode in the region 1 and the drive electrode in the region 3 is restored.

According to the method for controlling a touchscreen provided in this embodiment of this application, the electronic device receives the first touch signal from the user in the first region on the screen. The screen of the electronic device includes the first region and the second region, when the electronic device is in the folded state, each region corresponds to a baseline, and the baseline corresponds to a capacitance value when a region corresponding to the baseline is not touched. When the electronic device is in the folded state, the electronic device maintains the baseline corresponding to the first region unchanged in response to the first touch signal in the first region. When the electronic device is in the folded state, and the electronic device does not detect the second touch signal in the second region, the electronic device updates the baseline corresponding to the second region. When the electronic device is in the folded state, the electronic device reduces the emission frequency of the drive electrode in the first region in response to the first touch signal in the first region. In this embodiment, the plurality of baselines are maintained when the electronic device is in the folded state, so that the baseline corresponding to the first region can be stopped updating when the user holds the first region, and when the user does not touch the second region, the baseline corresponding to the second region is updated. In this way, the electronic device can quickly and accurately identify a touch operation performed by the user in the second region, thereby improving user experience. In addition, the emission frequency of the drive electrode in the first region is reduced in this embodiment, so that power consumption of the screen of the electronic device can be reduced.

Figure 16:
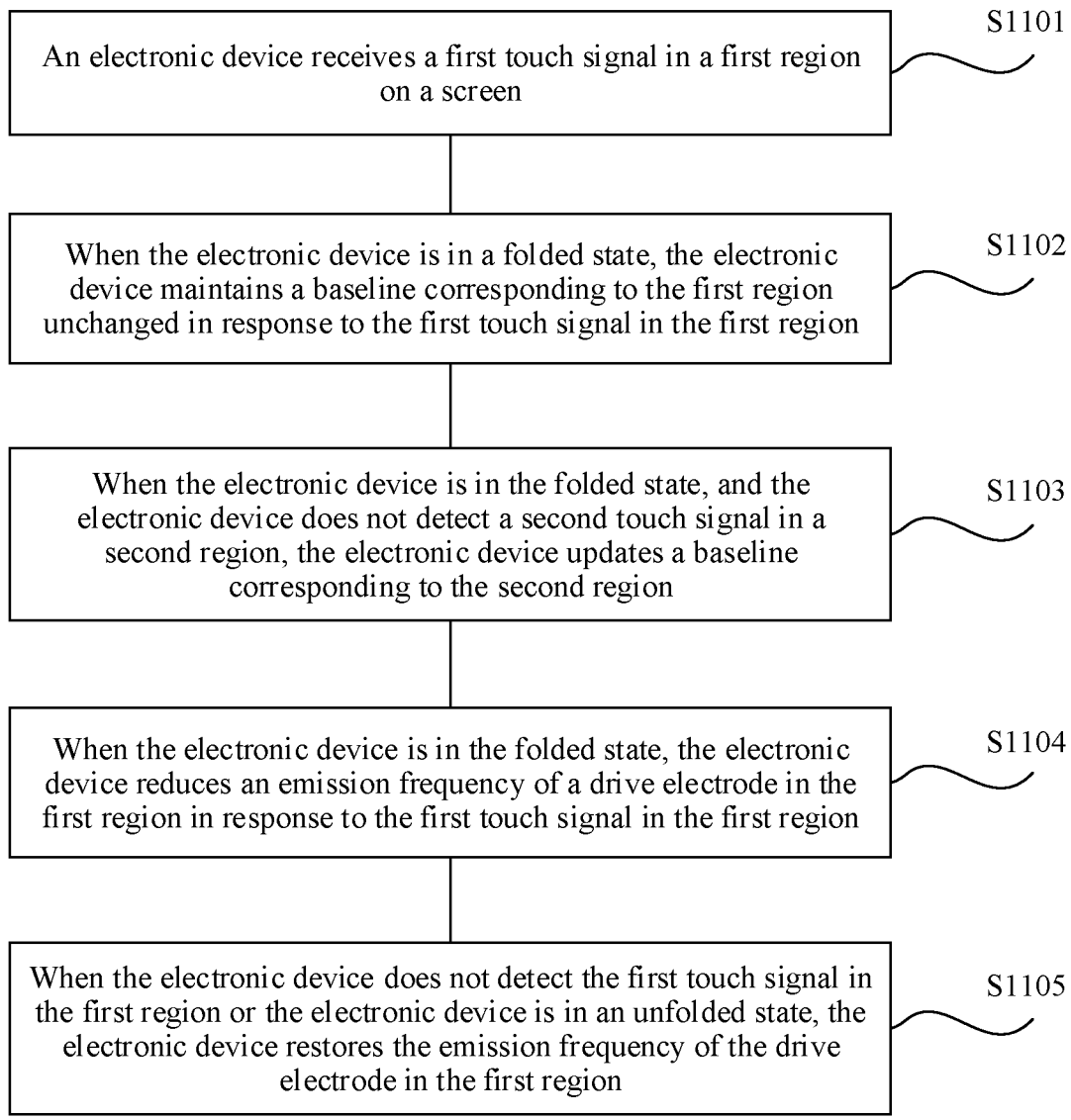
FIG. 16 is a schematic flowchart of another method for controlling a touchscreen according to an embodiment of this application.

Optionally, as shown in FIG. 16, after steps S1101 to S1104, when the user no longer touches the first region or the electronic device is in an unfolded state, the method for controlling a touchscreen may further include step S1105.

S1105: When the electronic device does not detect the first touch signal in the first region or the electronic device is in an unfolded state, the electronic device restores the emission frequency of the drive electrode in the first region.

For example, when the user no longer touches the first region, the electronic device may restore the emission frequency of the drive electrode in the first region to a normal frequency. For example, when the user no longer holds the region 1 and the region 3, the emission frequency of the drive electrode in the region 1 and the region 3 is restored to 120 Hz, so as to ensure that when the user touches the region 1 and the region 3 again, the electronic device can quickly identify a touch operation of the user.

For example, when the electronic device is in the unfolded state, the electronic device may restore the emission frequency of the drive electrode in the first region to the normal frequency, so that when the user touches the screen of the electronic device, the electronic device can quickly identify a touch operation of the user.

For example, the unfolded state that the electronic device is in is a state in which an included angle between a primary screen and a secondary screen of the electronic device is greater than or equal to a second preset angle threshold. The second preset angle threshold is greater than or equal to the first preset angle threshold. For example, the second preset angle threshold is 45°. As shown in FIG. 12, a state in which the included angle α between the primary screen and the secondary screen of the electronic device is greater than or equal to 45° is an unfolded state. When the electronic device is in the unfolded state, the at least two regions correspond to one baseline. That is, when the electronic device is in the unfolded state, the electronic device maintains only one baseline, and the baseline is recorded as a first baseline.

It may be understood that in this embodiment, when the electronic device is in the unfolded state, the at least two regions correspond to one baseline. In other words, when the electronic device is in the unfolded state, the electronic device only needs to maintain one baseline. When the electronic device is in the folded state, the electronic device may maintain a plurality of baselines.

According to the method for controlling a touchscreen provided in this embodiment of this application, the electronic device receives the first touch signal from the user in the first region on the screen. The screen of the electronic device includes the first region and the second region, when the electronic device is in the folded state, each region corresponds to a baseline, and the baseline corresponds to a capacitance value when a region corresponding to the baseline is not touched. When the electronic device is in the folded state, the electronic device maintains the baseline corresponding to the first region unchanged in response to the first touch signal in the first region. When the electronic device is in the folded state, and the electronic device does not detect the second touch signal in the second region, the electronic device updates the baseline corresponding to the second region. When the electronic device is in the folded state, the electronic device reduces the emission frequency of the drive electrode in the first region in response to the first touch signal in the first region. When the first region is not held by the user or the electronic device is in the unfolded state, the electronic device restores the emission frequency of the drive electrode in the first region. In this embodiment, the plurality of baselines are maintained when the electronic device is in the folded state, so that the baseline corresponding to the first region can be stopped updating when the user holds the first region, and when the user does not touch the second region, the baseline corresponding to the second region is updated. In this way, the electronic device can quickly and accurately identify a touch operation performed by the user in the second region, thereby improving user experience. In addition, in this embodiment, the emission frequency of the drive electrode in the first region is reduced, so that power consumption of the screen of the electronic device can be reduced. When the user no longer touches the first region or the electronic device is in the unfolded state, the emission frequency of the drive electrode in the first region is restored. Therefore, it can be ensured that when the user touches the first region again, the electronic device can quickly identify a touch operation performed by the user in the first region.

The foregoing mainly describes the solutions provided in the embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions for each particular application, but it should not be considered that the implementation goes beyond the scope of this application.

In the embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 17:
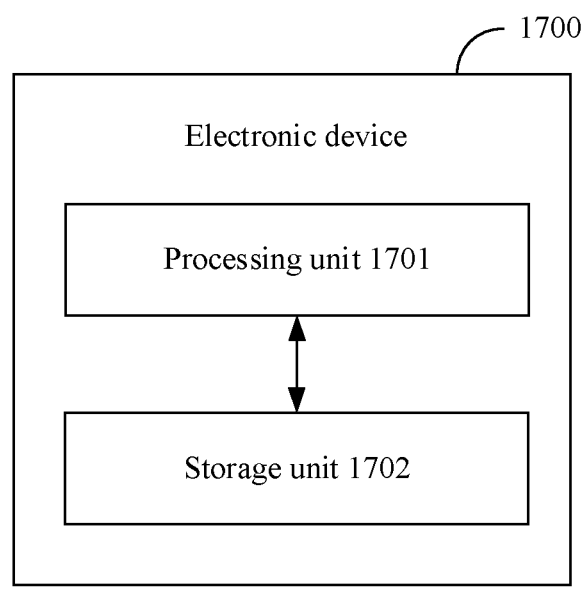
FIG. 17 is a schematic diagram of a composition of an electronic device according to an embodiment of this application.

When an integrated unit is used, FIG. 17 is a schematic diagram of a possible structure of the electronic device in the foregoing embodiments. The electronic device 1700 includes a processing unit 1701 and a storage unit 1702.

The processing unit 1701 is configured to control and manage an action of the electronic device 1700. For example, the processing unit 1701 may be configured to perform the processing steps of S401 and S402 in FIG. 4; may be configured to perform the processing steps of S401 to S403 in FIG. 7; may be configured to perform the processing steps of S401 to S404 in FIG. 8; may be configured to perform the processing steps of S401 to S405 in FIG. 10; may be configured to perform the processing steps of S1101 and S1102 in FIG. 11; may be configured to perform the processing steps of S1101 to S1103 in FIG. 14; may be configured to perform the processing steps of S1101 to S1104 in FIG. 15; may be configured to perform the processing steps of S1101 to S1105 in FIG. 16; and/or configured to perform other processes in the technology described in this specification.

The storage unit 1702 is configured to store program code and data of the electronic device 1700. For example, the storage unit 1702 may be configured to store a baseline or the like.

Certainly, units and modules in the electronic device 1700 include but are not limited to the processing unit 1701 and the storage unit 1702. For example, the electronic device 1700 may further include an audio unit, and a communications unit. The audio unit is configured to collect a voice sent by a user and play the voice. The communications unit is configured to support communication between the electronic device 1700 and another apparatus.

The processing unit 1701 may be a processor or a controller, for example, may be a touch IC, a central processing unit (central processing unit, CPU), a digital signal processor (digital signal processor, DSP), an application-specific integrated circuit (application specific integrated circuits, ASIC), a field programmable gate array (field programmable gate array, FPGA), another programmable logic component, a transistor logic component, a hardware component, or any combination thereof. The processor may include an application processor and a baseband processor. The processor may implement or execute various example logical blocks, modules, and circuits described with reference to content disclosed in this application. Alternatively, the processor may be a combination that implements a computing function, for example, includes a combination of one or more microprocessors, or a combination of a DSP and a microprocessor. These microprocessors may be integrated on one chip to form a system-on-a-chip (System-On-a-Chip, SoC). The storage unit 1702 may be a memory. The audio unit may include a microphone, a speaker, and the like. The communications unit may be a transceiver, a transceiver circuit, a communications interface, or the like.

For example, the processing unit 1701 is a processor (the processor 310 shown in FIG. 3), and the storage unit 1702 may be a memory (the internal memory 321 shown in FIG. 3). The audio unit may include a speaker (the speaker 370A shown in FIG. 3) and a microphone (the microphone 370C shown in FIG. 3). The communications unit includes a wireless communications module (the wireless communications module 360 shown in FIG. 3). The wireless communications module may be collectively referred to as a communications interface. The electronic device 1700 provided in this embodiment of this application may be the electronic device 300 shown in FIG. 3. The processor, the memory, the communications interface, and the like may be coupled together, for example, connected through a bus.

An embodiment of this application further provides a computer storage medium. The computer storage medium stores computer program code. When the processor executes the computer program code, the electronic device performs related method steps in FIG. 4, FIG. 7, FIG. 8, FIG. 10, FIG. 11, FIG. 14, FIG. 15, or FIG. 16 to implement the method in any one of the foregoing embodiments.

An embodiment of this application further provides a computer program product. When the computer program product runs on a computer, the computer is enabled to perform related method steps in FIG. 4, FIG. 7, FIG. 8, FIG. 10, FIG. 11, FIG. 14, FIG. 15, or FIG. 16 to implement the method in any one of the foregoing embodiments.

An embodiment of this application further provides a circuit system for controlling a touchscreen. The touchscreen includes a first region and a second region, the first region and the second region each correspond to a baseline, and the baseline corresponds to a capacitance value when a region corresponding to the baseline is not touched. The circuit system includes a processing unit. The processing unit is configured to perform related method steps in FIG. 4, FIG. 7, FIG. 8, FIG. 10, FIG. 11, FIG. 14, FIG. 15, or FIG. 16 to implement the method in any one of the foregoing embodiments.

All the electronic device 1700, the computer storage medium, the computer program product, and the circuit system for controlling a touchscreen provided in the embodiments of this application are configured to perform the corresponding methods provided above. Therefore, for beneficial effects that can be achieved, refer to the beneficial effects of the corresponding methods provided above. Details are not described herein again.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented according to a requirement, that is, an inner structure of an apparatus is divided into different functional modules to implement all or some of the functions described above.

Method or algorithm steps described in combination with the content disclosed in this application may be implemented by hardware, or may be implemented by a processor by executing a software instruction. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in this application may be implemented by using hardware, software, firmware, or any combination thereof. When software is used to implement the functions, the functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

What is claimed is:

1. Lee teaches a method for controlling a touchscreen of an electronic device, wherein the method comprises:
receiving, a first touch signal in a first region of the touchscreen, wherein the first touch signal is based on a user holding the electronic device,
maintaining, in response to the first touch signal, a first baseline corresponding to the first region, wherein the first baseline corresponds to a first capacitance value when the first region is not touched;
updating a second baseline corresponding to a second region of the touchscreen when not detecting a second touch signal in the second region,
wherein the first region and the second region do not overlap each other, and
wherein the second baseline corresponds to a second capacitance value when the second region is not touched;
reducing, in response to the first touch signal, an emission frequency of a drive electrode in the first region; and
restoring the emission frequency when the first touch signal terminates;
wherein the touchscreen is a curved screen with a radian on a side edge, wherein the electronic device is a foldable electronic device, and wherein the electronic device is in a folded state.

2. The method of claim 1, wherein the touchscreen further comprises a third region of a main control screen and a fourth region of a side curved screen, and wherein the first region is the fourth region.

3. The method of claim 1, wherein the touchscreen further comprises a third region of a main control screen, a fourth region of a first side curved screen, and a fifth region of a second side curved screen, and wherein the first region is the fourth region.

4. An electronic device comprising:
a touchscreen, comprising:
a first region configured to receive a first touch signal, wherein the first region is configured to a first baseline, wherein the first baseline corresponds to a first capacitance value when the first region is not touched, wherein the first touch signal is based on a user holding the electronic device; and
a second region, the first region and the second region each correspond configured to a second baseline, wherein the second baseline corresponds to a second capacitance value when a region corresponding to the baseline the second region is not touched, wherein the first region and the second region do not overlap each other; and
a processing unit, processor coupled to the touchscreen and configured to:
maintain, in response to the first touch signal, the first baseline; and
update the second baseline when not detecting a second touch signal in the second region,
wherein the touchscreen is a curved screen with a radian on a side edge,
wherein the electronic device is a foldable electronic device, and
wherein the electronic device is in a folded state.

5. The electronic device of claim 4, wherein the touchscreen further comprises a third region of a main control screen, a fourth region of a first side curved screen, and a fifth region of a second side curved screen, and wherein the first region is at least one of the fourth region or the fifth region.

6. The method of claim 1, wherein the touchscreen further comprises a third region of a main control screen, a fourth region of a first side curved screen, and a fifth region of a second side curved screen, and wherein the first region is the fifth region.

7. The method of claim 1, wherein the drive electrode is a longitudinal electrode, and wherein the method further comprises restoring the emission frequency when the electronic device is in the folded state.

8. The method of claim 7, wherein the touchscreen further comprises a third region of a primary screen, a fourth region of a secondary screen, and a fifth region of a side screen, and wherein the first region is the third region.

9. The method of claim 8, wherein an included angle between the primary screen and the secondary screen is less than a first preset angle threshold in the folded state.

10. The method of claim 7, wherein the touchscreen further comprises a third region of a primary screen, a fourth region of a secondary screen, and a fifth region of a side screen, and wherein the first region is the fourth region.

11. The method of claim 7, wherein the touchscreen further comprises a third region of a primary screen, a fourth region of a secondary screen, and a fifth region of a side screen, and wherein the first region is the fifth region.

12. The electronic device of claim 4, wherein the touchscreen further comprises a third region of a primary screen, a fourth region of a secondary screen, and a fifth region of a side screen, and wherein the first region is the third region.

13. The electronic device of claim 12, wherein an included angle between the primary screen and the secondary screen is less than a preset angle threshold in the folded state.

14. The electronic device of claim 4, wherein the processor is further configured to:
　reduce, in response to the first touch signal, an emission frequency of a drive electrode in the first region in response to the first touch signal; and
　restore the emission frequency when the processor does not detect the first touch signal in the first region.

15. The electronic device of claim 14, wherein the drive electrode is a longitudinal electrode.

16. The electronic device of claim 4, wherein the touchscreen further comprises a third region of a main control screen and a fourth region of a side curved screen, and wherein the first region is the fourth region.

17. The electronic device of claim 4, wherein the touchscreen further comprises a third region of a primary screen, a fourth region of a secondary screen, and a fifth region of a side screen, and wherein the first region is the fourth region.

18. The electronic device of claim 4, wherein the touchscreen further comprises a third region of a primary screen, a fourth region of a secondary screen, and a fifth region of a side screen, and wherein the first region is the fifth region.

19. A computer program product comprising computer-executable instructions that are stored on a non-transitory computer-readable medium and that, when executed by a processor, cause an electronic device to:
　receive a first touch signal in a first region of a touchscreen of the electronic device, wherein the first touch signal is based on a user holding the electronic device;
　maintain, in response to the first touch signal, a first baseline corresponding to the first region, wherein the first baseline corresponds to a first capacitance value when the first region is not touched;
　update a second baseline corresponding to a second region of the touchscreen when not detecting a second touch signal in the second region, wherein the first region and the second region do not overlap each other, and wherein the second baseline corresponds to a second capacitance value when the second region is not touched;
　reduce, in response to the first touch signal, an emission frequency of a drive electrode in the first region; and
　restore the emission frequency when not detecting the first touch signal in the first region,
　wherein the touchscreen is a curved screen with a radian on a side edge,
　wherein the electronic device is a foldable electronic device, and
　wherein the electronic device is in a folded state.

20. The computer program product of claim 19, wherein the drive electrode is a longitudinal electrode.

* * * * *

UNITED STATES PATENT AND TRADEMARK OFFICE
CERTIFICATE OF CORRECTION

PATENT NO. : 11,775,111 B2
APPLICATION NO. : 17/641333
DATED : October 3, 2023
INVENTOR(S) : Hang Li and Weigang Cai Page 1 of 1

It is certified that error appears in the above-identified patent and that said Letters Patent is hereby corrected as shown below:

In the Claims

Claim 4, Column 34, Lines 22 and 23: "second region, the first region and the second region each correspond configured to" should read "second region configured to"

Claim 4, Column 34, Lines 25 and 26: "value when a region corresponding to the baseline the second" should read "value the second"

Claim 14, Column 35, Lines 14 and 15: "first region in response to the first touch signal; and" should read "first region; and"

Signed and Sealed this
Fifth Day of December, 2023

Katherine Kelly Vidal
*Director of the United States Patent and Trademark Office*